US012286984B2

(12) United States Patent
Takahashi

(10) Patent No.: US 12,286,984 B2
(45) Date of Patent: Apr. 29, 2025

(54) FLUID INJECTION OR SUCTION DEVICE

(71) Applicant: FUJI FILTER MANUFACTURING CO., LTD., Tokyo (JP)

(72) Inventor: Yuichi Takahashi, Tochigi (JP)

(73) Assignee: FUJI FILTER MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/260,165

(22) PCT Filed: Dec. 28, 2021

(86) PCT No.: PCT/JP2021/048929
§ 371 (c)(1),
(2) Date: Jun. 30, 2023

(87) PCT Pub. No.: WO2022/149559
PCT Pub. Date: Jul. 14, 2022

(65) Prior Publication Data

US 2024/0060518 A1 Feb. 22, 2024

(30) Foreign Application Priority Data

Jan. 6, 2021 (JP) ................................ 2021-000923

(51) Int. Cl.
*F15B 15/22* (2006.01)
*B05B 9/04* (2006.01)
*F15B 15/14* (2006.01)

(52) U.S. Cl.
CPC ............ *F15B 15/22* (2013.01); *B05B 9/0409* (2013.01); *F15B 15/1433* (2013.01); *F15B 15/149* (2013.01); *F15B 15/1457* (2013.01)

(58) Field of Classification Search
CPC ..... B05B 9/0409; B05B 9/0413; B05B 15/72; B05B 15/74; F04B 49/22; F04B 49/225; F04B 53/12; G01F 11/04; G01F 11/06
See application file for complete search history.

(56) References Cited

U.S. PATENT DOCUMENTS 806,779 A * 12/1905 Coffield .................. F01B 17/00 91/228
858,226 A * 6/1907 Shevlin et al. ......... F01B 17/00 91/228
(Continued)

FOREIGN PATENT DOCUMENTS

DE 2129588 C3 10/1975
DE 3634725 A1 4/1988
(Continued)

OTHER PUBLICATIONS

WIPO, Japan Patent Office as International Search Authority, International Search Report (with English translation) and Written Opinion mailed Mar. 1, 2022 in International Patent Application No. PCT/JP2021/048929, 13 pages.
European Patent Office, Extended European Search Report dated Nov. 11, 2024 in European Patent Application No. 21917779.7, 45 pages.

*Primary Examiner* — Thomas E Lazo
(74) *Attorney, Agent, or Firm* — MASUVALLEY & PARTNERS; Peter Martinez

(57) ABSTRACT

The present invention includes: a cylinder; a piston that is inserted in the cylinder and partitions an interior of the cylinder into fluid chambers and; guides that support the piston and guide movement of the cylinder, the guides including a first internal flow passage and a second internal flow passage; and nozzles communicating with the fluid chambers, respectively, wherein a pipe to communicate with a fluid pressure source is configured to switch between the external pipes, a flow passage from the fluid pressure source to the nozzles includes a short-circuit flow passage that short-circuits a flow passage communicating with the fluid pressure source and a flow passage not communicating with the fluid pressure source, and this short-circuit flow passage is provided with a throttle unit that throttles a flow passage.

16 Claims, 21 Drawing Sheets

(56) References Cited

U.S. PATENT DOCUMENTS

| | | | | | |
|---|---|---|---|---|---|
| 955,501 | A * | 4/1910 | Coffield | F01L 21/04 | 91/229 |
| 2,987,051 | A * | 6/1961 | Goyette | B65H 54/283 | 91/224 |
| 4,034,648 | A * | 7/1977 | Blackett, Jr. | F01L 21/04 | 92/111 |
| 5,366,159 | A * | 11/1994 | Childers | B05B 7/26 | 137/564.5 |
| 5,540,136 | A * | 7/1996 | Noord | F01L 21/04 | 91/228 |
| 5,715,797 | A * | 2/1998 | Minagawa | F02D 41/3082 | 123/497 |
| 6,663,360 | B1 * | 12/2003 | Kyer | F02M 59/107 | 417/399 |

FOREIGN PATENT DOCUMENTS

| | | | | |
|---|---|---|---|---|
| EP | 0803670 | A2 | 10/1997 | |
| FR | 2681646 | A1 | 3/1993 | |
| GB | 302695 | A | 1/1930 | |
| GB | 2046831 | A | 11/1980 | |
| JP | 48-9431 | B | 3/1973 | |
| JP | S63-294982 | A | 12/1988 | |
| JP | H09-184460 | A | 7/1997 | |
| JP | H11-57643 | A | 3/1999 | |
| JP | 2007-229687 | A | 9/2007 | |
| JP | 2016203111 | A * | 12/2016 | |
| JP | 2017-160890 | A | 9/2017 | |
| WO | WO-0232583 | A1 * | 4/2002 | B05B 13/0405 |

* cited by examiner

FLUID INJECTION OR SUCTION DEVICE

RELATED APPLICATIONS

This application is the U.S. National Phase of and claims priority to International Patent Application No. PCT/JP2021/048929, International Filing Date Dec. 28, 2021, entitled Fluid Injection Or Suction Device; which claims benefit of Japanese Patent Application No. 2021-000923 filed Jan. 6, 2021; both of which are incorporated herein by reference in their entireties.

FIELD

The present invention relates to a fluid injection or suction device that injects or suctions fluid.

BACKGROUND

A fluid injection or suction device has been known as described in, for example, Patent Literature 1 in which two nozzles, each of which is provided for each of two spaces partitioned by a piston inserted in a cylinder, communicate with the exterior of the cylinder, and fluid is injected or suctioned between the exterior of the cylinder and the two spaces through the two nozzles. In this fluid injection or suction device, the piston is fixed, and at the time of fluid injection, the fluid is fed from a high-pressure source to one of the spaces, or at the time of fluid suction, the fluid is suctioned from one of the spaces to a low-pressure source. This fluid injection or suction device uses volume changes in the two spaces at this time to move the cylinder.

CITATION LIST

Patent Literature

Patent Literature 1: Japanese Patent Application Laid-open No. 2016-203111

SUMMARY

Technical Problem

In the fluid injection or suction device described in Patent Literature 1, provided that the fluid injection quantity or suction quantity is constant, the cylinder can be moved at a constant velocity. However, it is assumed that there are circumstances where it is necessary to reduce the cylinder movement velocity for some reasons.

It is possible to reduce the cylinder movement velocity by adjusting a generated pressure from the high-pressure source or the low-pressure source. However, during fluid injection, when the cylinder movement velocity is reduced by decreasing the generated pressure from the high-pressure source, the fluid injection quantity decreases. In contrast, during fluid suction, when the cylinder movement velocity is reduced by increasing the generated pressure from the low-pressure source, the fluid suction quantity decreases.

It is also possible to reduce the cylinder movement velocity by designing the cylinder to increase the maximum volume of the two spaces in the cylinder or by designing the nozzle with a reduced diameter. However, as the maximum volume of the two spaces in the cylinder is increased, the diameter of the cylinder increases, which may limit the installation space, or as the nozzle diameter is reduced, this may lead to a decrease in the fluid injection quantity or suction quantity.

In view of the problems described above, the present invention has an object to provide a fluid injection or suction device capable of reducing a cylinder movement velocity with a simple configuration, while preventing an increase in body size and a decrease in fluid injection quantity or suction quantity.

Solution to Problem

A fluid injection or suction device according to the present invention injects fluid to a target space or suctions fluid from the target space through nozzles, the device comprising: a cylinder formed in a hollow tubular shape and closed at opposite opening end portions by closing members; a piston that is inserted in the cylinder in a relatively movable manner between the opposite opening end portions, and that partitions an interior of the cylinder into a first fluid chamber and a second fluid chamber; a guide extending from the piston inserted in the cylinder, penetrating the closing members to an exterior of the cylinder, and fixed to support the piston and guide movement of the cylinder in sliding contact with through holes in the closing members, the guide including a first internal flow passage that connects the first fluid chamber externally to a first external pipe so as to communicate with each other, and a second internal flow passage that connects the second fluid chamber externally to a second external pipe so as to communicate with each other, the guide having an area of a circumferential outer shape smaller than that of the piston; a first nozzle of the nozzles, through which the first fluid chamber and the target space communicate with each other; and a second nozzle of the nozzles, through which the second fluid chamber and the target space communicate with each other, wherein a pipe to communicate with a fluid pressure source that generates fluid at a predetermined pressure is configured to switch between the first pipe and the second pipe, and a flow passage from the fluid pressure source to the first nozzle and the second nozzle includes a short-circuit flow passage that short-circuits a flow passage communicating with the fluid pressure source and a flow passage not communicating with the fluid pressure source, and the short-circuit flow passage is provided with a throttle unit that throttles a flow passage.

Advantageous Effects of Invention

The fluid injection or suction device according to the present invention can reduce the cylinder movement velocity with a simple configuration, while preventing an increase in body size and a decrease in fluid injection quantity or suction quantity.

DESCRIPTION OF EMBODIMENTS

Embodiments to implement the present invention are described below in detail with reference to the accompanying drawings.

First Embodiment

Figure 1:
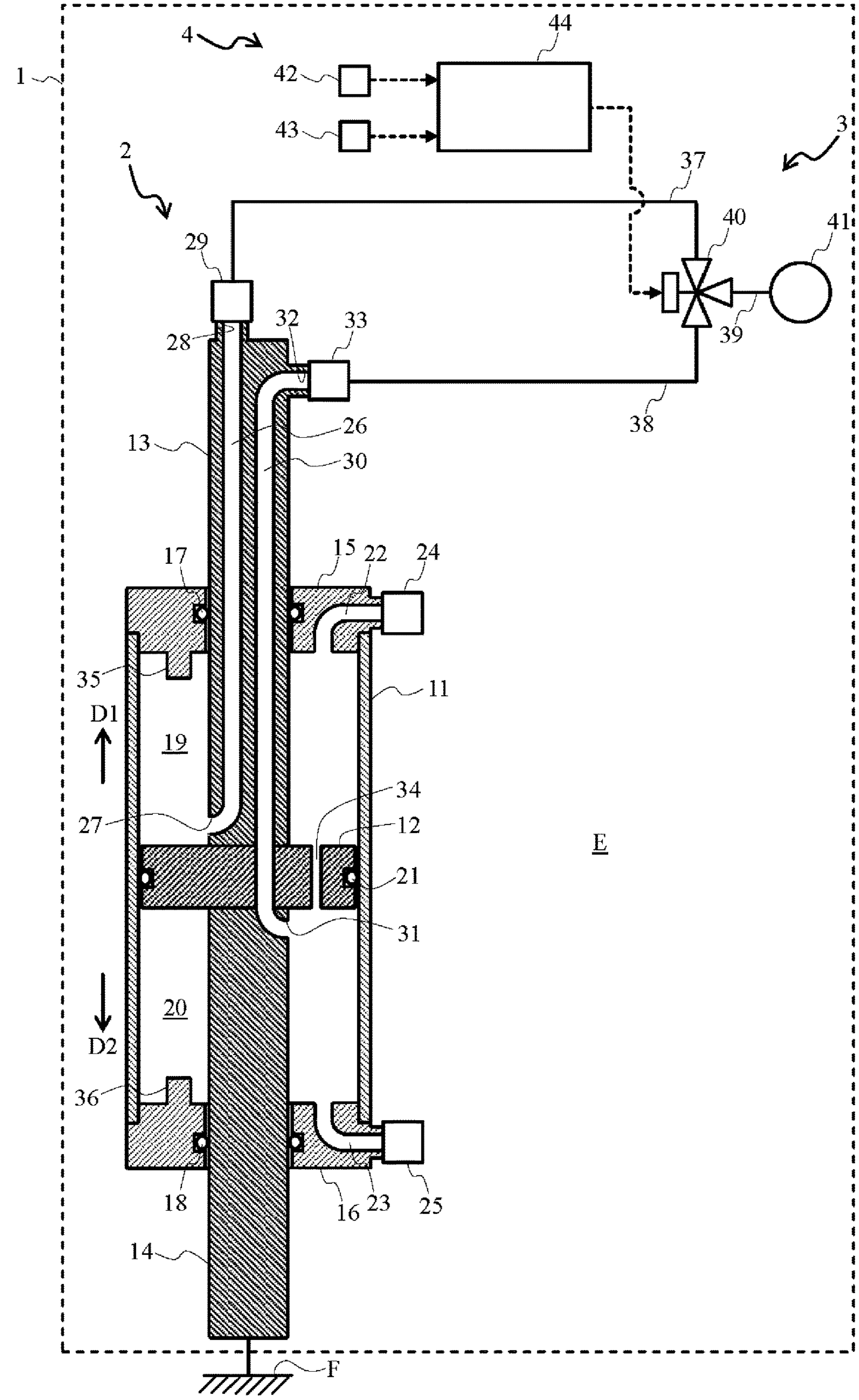
FIG. 1 is a schematic configuration diagram schematically illustrating a fluid injection or suction device according to a first embodiment.

With reference to FIGS. 1 to 5, a fluid injection or suction device according to a first embodiment is described. FIG. 1 is a cross-sectional view illustrating a schematic configuration of the fluid injection or suction device according to the first embodiment. A fluid injection or suction device (hereinafter, simply referred to as "fluid device") 1 is incorporated into, for example, a filtration device as a filter cleaning function. The fluid device 1 is used for the purpose of removing captured matter, deposited on a filter by a filtration function of the filtration device, by injecting fluid to the filter or by suctioning fluid through the filter. In the schematic configuration, the fluid device 1 includes a piston-cylinder mechanism 2, an external piping system 3 connected to the piston-cylinder mechanism 2, and a control system 4.

(Piston-Cylinder Mechanism)

The piston-cylinder mechanism 2 is a mechanism to inject fluid while moving the fluid injection position, or to suction fluid while moving the fluid suction position. The piston-cylinder mechanism 2 is located in a fluid injection or suction target space (hereinafter, referred to as "target space") E. The piston-cylinder mechanism 2 is mainly made up of a movable cylinder 11, a piston 12, a first guide 13, and a second guide 14.

Specifically, the movable cylinder 11 is formed in a uniform hollow tubular shape in cross section, and the piston 12 with its circumferential outer shape formed along the inner circumferential surface of the movable cylinder 11 is inserted in the movable cylinder 11 in a relatively movable manner between opposite opening end portions of the movable cylinder 11. The first guide 13 and the second guide 14 are formed to extend in a uniform solid rod-like shape in cross section, and to have an area of their circumferential outer shape smaller than the area of the circumferential outer shape of the piston 12, and are connected to the piston 12 or formed integrally with the piston 12 to be brought into a state as described below. That is, the first guide 13 extends outward from a portion of the inserted piston 12 directed toward one opening end portion of the movable cylinder 11 through the one opening end portion. The second guide 14 extends outward from a portion of the inserted piston 12 directed toward the other opening end portion of the movable cylinder 11 through the other opening end portion. At least one of the first guide 13 and the second guide 14 (the second guide 14 in the illustrated example) is fixed to an external structure F external to the piston-cylinder mechanism 2 (or may be in the target space E. The same applies hereinafter). The piston 12 is supported through at least one of the guides 13 and 14. In this manner, the piston-cylinder mechanism 2 is configured such that the movable cylinder 11 is guided by the guides 13 and 14 to perform reciprocating motion, while being in sliding contact with the piston 12.

In the following descriptions, for the sake of easy explanation, it is assumed that the movable cylinder 11 is formed in a straight tubular shape, and the guides 13 and 14 straightly extend outward from the piston 12 inserted in the movable cylinder 11 along the shape of the movable cylinder 11 through opposite opening end rear portions of the movable cylinder 11. With this configuration, the movable cylinder 11 moves straightly in a direction D1 from the piston 12 toward the first guide 13 or in a direction D2 from the piston 12 toward the second guide 14. As the directions D1 and D2, a direction can be selected from among various directions such as a vertical direction and a horizontal direction according to the installation orientation of the piston-cylinder mechanism 2.

One opening end portion of the movable cylinder 11 is closed by a first closing member 15, while the other opening end portion of the movable cylinder 11 is closed by a second closing member 16. The first guide 13 penetrates the first closing member 15 in a relatively movable manner. The second guide 14 penetrates the second closing member 16 in a relatively movable manner. The guides 13 and 14 guide the movement of the movable cylinder 11 by coming into sliding contact, on their outer circumferential surfaces, with the inner circumferential surfaces of through holes in the closing members 15 and 16, respectively.

An annular sealing member 17 such as an O-ring is held in a groove that is formed into a recess extending over the entire inner circumferential surface of the through hole in the first closing member 15 opposed to the outer circumferential surface of the first guide 13. An annular sealing member 18 similar to the sealing member 17 is held in a groove that is formed into a recess extending over the entire inner circumferential surface of the through hole in the second closing member 16 opposed to the outer circumferential surface of the second guide 14. These sealing members 17 and 18 are configured to come into contact with the outer circumferential surfaces of the guides 13 and 14, respectively, to maintain the liquid tightness or airtightness between the inside and outside of the movable cylinder 11.

The internal space of the movable cylinder 11 closed by the two closing members 15 and 16 is partitioned by the inserted piston 12 into two spaces, a first fluid chamber 19 and a second fluid chamber 20. Specifically, the first fluid chamber 19 is defined by the piston 12, the first closing member 15, the movable cylinder 11, and the first guide 13, while the second fluid chamber 20 is defined by the piston 12, the second closing member 16, the movable cylinder 11, and the second guide 14. For example, provided that the cross-sectional outer shapes of the guides 13 and 14 do not overlap the cross-sectional outer shape of the piston 12 when viewed from the direction D1 or the direction D2, the first fluid chamber 19 and the second fluid chamber 20 are cylindrical spaces.

In order to exactly partition the internal space of the movable cylinder 11 into two spaces, the first fluid chamber 19 and the second fluid chamber 20, an annular sealing member 21 such as an O-ring is held in a groove that is formed into a recess extending over the entire outer circumferential surface of the piston 12 opposed to the inner circumferential surface of the movable cylinder 11. This sealing member 21 is configured to come into sliding contact with the inner circumferential surface of the movable cylinder 11 when the movable cylinder 11 moves along the guides 13 and 14, and maintain the liquid tightness or airtightness between the first fluid chamber 19 and the second fluid chamber 20.

In a mobile element, such as the movable cylinder 11 and the closing members 15 and 16, that moves relative to a stationary element such as the piston 12 and the guides 13 and 14, a first communication passage 22 is formed through which the first fluid chamber 19 communicates with the target space E. In the illustrated example, the first communication passage 22 is drilled in the first closing member 15. In the mobile element, a second communication passage 23 is also formed through which the second fluid chamber 20 communicates with the target space E. In the illustrated example, the second communication passage 23 is drilled in the second closing member 16.

The first communication passage 22 described above is provided with a first nozzle 24 having a hollow tubular shape and protruding toward the target space E. Similarly to the above, the second communication passage 23 described above is provided with a second nozzle 25 having a hollow tubular shape and protruding toward the target space E. The first nozzle 24 and the second nozzle 25 inject fluid in the fluid chambers 19 and 20 to the target space E, or suction fluid in the target space E into the fluid chambers 19 and 20 according to the type of fluid pressure source (described later) of the external piping system 3 connected to the piston-cylinder mechanism 2. The first nozzle 24 has a significantly smaller flow-passage cross-sectional area than the effective area of the inner surface of the first fluid chamber 19, to which a fluid pressure in the first fluid chamber 19 is applied in the direction D1 (hereinafter, referred to as "first effective pressure-receiving area"). The second nozzle 25 has a significantly smaller flow-passage cross-sectional area than the effective area of the inner surface of the second fluid chamber 20, to which a fluid pressure in the second fluid chamber 20 is applied in the direction D2 (hereinafter, referred to as "second effective pressure-receiving area"). In the following descriptions, for the sake of easy explanation, the first effective pressure-receiving area and the second effective pressure-receiving area are defined as an equal effective cylinder pressure-receiving area S, and the flow-passage cross-sectional area of the first nozzle 24 and the flow-passage cross-sectional area of the second nozzle 25 are defined as being equal to each other.

Inside the first guide 13, a first internal flow passage 26 is formed connecting the first fluid chamber 19 and the external piping system 3 so as to communicate with each other. Specifically, the first internal flow passage 26 extends from a first inner opening 27 that is open toward the first fluid chamber 19 at a portion of the first guide 13 near the piston 12 to a first outer opening 28 that is open toward the exterior of the piston-cylinder mechanism 2 at an extended end portion of the first guide 13. The first outer opening 28 is provided with a first connector 29 that connects the first internal flow passage 26 to the external piping system 3 so as to communicate with each other.

Inside the first guide 13, the piston 12, and the second guide 14, a second internal flow passage 30 is formed connecting the second fluid chamber 20 and the external piping system 3 so as to communicate with each other. Specifically, the second internal flow passage 30 extends from a second inner opening 31 that is open toward the second fluid chamber 20 at a portion of the second guide 14 near the piston 12 to a second outer opening 32 that is open toward the exterior of the piston-cylinder mechanism 2 at another extended end portion of the first guide 13 separately from the first outer opening 28. The second outer opening 32 is provided with a second connector 33 that connects the second internal flow passage 30 to the external piping system 3 so as to communicate with each other.

The piston-cylinder mechanism 2 configured as described above has substantially the same configuration as a fluid supply and suction unit disclosed in Japanese Patent Application Laid-open No. 2016-203111. However, the piston-cylinder mechanism 2 is different from this fluid supply and suction unit in that the piston-cylinder mechanism 2 includes an orifice flow passage 34 drilled in the piston 12. The orifice flow passage 34 includes a short-circuit flow passage that connects (short-circuits) the first fluid chamber 19 and the second fluid chamber 20 so as to communicate with each other, and an orifice (throttle) serving as a throttle unit that throttles this short-circuit flow passage. The flow-passage cross-sectional area of the orifice flow passage 34 is set to a significantly smaller value than the effective cylinder pressure-receiving area S described above.

The piston 12 also functions as a stopper that regulates the movement of the movable cylinder 11 by abutting the second closing member 16 when the movable cylinder 11 moves in the direction D1, or by abutting the first closing member 15 when the movable cylinder 11 moves in the direction D2. The position of the first closing member 15 when the movement of the movable cylinder 11 in the direction D1 is regulated is referred to as "D1 regulated position". The state of the fluid device 1 when the movement of the movable cylinder 11 is regulated at this position is referred to as "D1 regulated state". The position of the second closing member 16 when the movement of the movable cylinder 11 in the direction D2 is regulated is referred to as "D2 regulated position". The state of the fluid device 1 when the movement of the movable cylinder 11 is regulated at this position is referred to as "D2 regulated state".

In the D2 regulated state, it is assumed that the first closing member 15 closes the first inner opening 27, which makes it difficult for fluid to flow between the target space E and the first internal flow passage 26. In view of this assumption, the first closing member 15 includes a first protruding portion 35 that protrudes partially from the first closing member 15 toward the first fluid chamber 19. The first protruding portion 35 has a protruding amount that is set in such a manner that the first closing member 15 is spaced apart from the piston 12 to a position where the first closing member 15 is prevented from completely closing the first inner opening 27 when the first protruding portion 35 abuts the piston 12 in the D2 regulated state.

In the D1 regulated state, it is assumed that the second closing member 16 closes the second inner opening 31, which makes it difficult for fluid to flow between the target space E and the second internal flow passage 30. In view of this assumption, the second closing member 16 includes a second protruding portion 36 that protrudes partially from the second closing member 16 toward the second fluid chamber 20. The second protruding portion 36 has a protruding amount that is set in such a manner that the second closing member 16 is spaced apart from the piston 12 to a position where the second closing member 16 is prevented from completely closing the second inner opening 31 when the second protruding portion 36 abuts the piston 12 in the D1 regulated state.

(External Piping System)

The external piping system 3 includes a first external pipe 37, a second external pipe 38, a pressure connection pipe 39, a flow-passage switching valve 40, and a fluid pressure source 41. The first external pipe 37 is connected at one end to the first connector 29 described above, while being connected at the other end to the flow-passage switching valve 40. The second external pipe 38 is connected at one end to the second connector 33 described above, while being connected at the other end to the flow-passage switching valve 40. The pressure connection pipe 39 is connected at one end to the flow-passage switching valve 40, while being connected at the other end to the fluid pressure source 41. As the flow-passage switching valve 40, a three-way solenoid valve is used. The three-way solenoid valve includes a first port connecting to the first external pipe 37, a second port connecting to the second external pipe 38, and a pressure source port connecting to the pressure connection pipe 39. The three-way solenoid valve is configured to be capable of closing at least either the first port or the second port by external control. Switching between the ports of the three-way solenoid valve makes it possible for fluid to flow between the fluid pressure source 41 and the target space E through the piston-cylinder mechanism 2 via either a first flow-passage system or a second flow-passage system. The first flow-passage system is made up of the first external pipe 37, the first internal flow passage 26, the first fluid chamber 19, the first communication passage 22, and the first nozzle 24. The second flow-passage system is made up of the second external pipe 38, the second internal flow passage 30, the second fluid chamber 20, the second communication passage 23, and the second nozzle 25.

As the flow-passage switching valve 40, two units of two-way solenoid valves may be used instead of using the three-way solenoid valve. Specifically, the pressure connection pipe 39 connected to the fluid pressure source 41 may be branched into two pipes so as to connect a branch port of one of the two branched pipes to the first external pipe 37 through one of the two-way solenoid valves, and so as to connect a branch port of the other of the two branched pipes to the second external pipe 38 through the other two-way solenoid valve. The two-way solenoid valve connected to the first external pipe 37 is opened, while the two-way solenoid valve connected to the second external pipe 38 is closed, so that it is possible for fluid to flow between the fluid pressure source 41 and the target space E through the piston-cylinder mechanism 2 via the first flow-passage system. In contrast, the two-way solenoid valve connected to the first external pipe 37 is closed, while the two-way solenoid valve connected to the second external pipe 38 is opened, so that it is possible for fluid to flow between the fluid pressure source 41 and the target space E through the piston-cylinder mechanism 2 via the second flow-passage system. In short, the flow-passage switching valve 40 can be of any type, provided that the flow-passage switching valve 40 is an externally-controllable solenoid valve that enables fluid to flow between the fluid pressure source 41 and the target space E through the piston-cylinder mechanism 2 via either the first flow-passage system or the second flow-passage system.

As the fluid pressure source 41, a high-pressure source is used when fluid is injected from the fluid chambers 19 and 20 to the target space E through the nozzles 24 and 25, while a low-pressure source is used when fluid is suctioned from the target space E into the fluid chambers 19 and 20 through the nozzles 24 and 25.

The high-pressure source generates fluid at a higher pressure than the pressure in the target space E (hereinafter, referred to as "target space pressure") $P_{tgt}$. Specifically, the generated pressure from the high-pressure source is set to a pressure higher than a pressure ($P_{tgt}$+Δp) calculated in consideration of a flow passage loss and other factors Op from the high-pressure source to the nozzles 24 and 25 (such as the first flow-passage system or the second flow-passage system) relative to the target space pressure $P_{tgt}$. For example, the high-pressure source includes a fluid storage tank that stores fluid therein, and a pump that pressurizes the fluid in this fluid storage tank to a given pressure, and may further include a regulator, a buffer tank, and other devices to regulate the pressure at a given level. However, when the pressure ($P_{tgt}$+Δp), which is calculated in consideration of a flow passage loss and other factors Op from the high-pressure source to the fluid chamber relative to the target space pressure $P_{tgt}$, is lower than the atmospheric pressure, the high-pressure source may be omitted and the pressure source port may be opened to the atmosphere.

The low-pressure source generates fluid at a lower pressure than the target space pressure $P_{tgt}$. Specifically, the generated pressure from the low-pressure source is set to a pressure lower than a pressure ($P_{tgt}$−Δp) calculated in consideration of a flow passage loss and other factors Op from the nozzles 24 and 25 to the low-pressure source (such as the first flow-passage system or the second flow-passage system) relative to the target space pressure $P_{tgt}$. For example, the low-pressure source includes a vacuum pump, and may further include a regulator, a buffer tank, and other devices to regulate the pressure at a given level. However, when the target space pressure $P_{tgt}$ is higher than a pressure calculated by adding the flow passage loss and other factors Op from the nozzles 24 and 25 to the low-pressure source to the atmospheric pressure, the low-pressure source may be omitted and the pressure source port may be opened to the atmosphere.

(Control System)

The control system 4 includes a first proximity detector 42, a second proximity detector 43, and a controller 44. The first proximity detector 42 is located and configured to output a detection signal when detecting the movement of the movable cylinder 11 to the D1 regulated position. The second proximity detector 43 is located and configured to output a detection signal when detecting the movement of the movable cylinder 11 to the D2 regulated position. For the proximity detectors 42 and 43, various detection methods can be employed, including a contact method with a limit switch or the like, and a non-contact method with a proximity sensor using light, magnetism, or electrostatic induction. The controller 44 switches between the ports of the flow-passage switching valve 40 by outputting a control signal based on two output signals from the first proximity detector 42 and the second proximity detector 43.

The controller 44 includes a microcomputer including a processor such as a CPU (Central Processing Unit). This microcomputer includes a ROM (Read Only Memory), a RAM (Random Access Memory), an input/output interface, and other devices that are connected to the processor by an internal bus such that these devices can communicate with the processor. The controller 44 controls the operation of the fluid device 1 by performing software processing in which the processor of the microcomputer reads an operation control program for the fluid device 1 from the ROM into the RAM, and executes the operation control program. However, the operation control of the fluid device 1 in the controller 44 may be conducted partially or entirely by means of the hardware configuration of the fluid device 1.

As described above, various kinds of fluid can be used as the fluid to be injected or suctioned in the fluid device 1 including the piston-cylinder mechanism 2, the external piping system 3, and the control system 4, appropriate to the intended use of the fluid device 1. For example, for cleaning purposes, a water soluble detergent, an organic solvent, or an oil can be used other than water, and further in gaseous form, air or various other kinds of gases can be used. For coating purposes, various kinds of paints can be used. For spraying purposes, various kinds of spray solutions can be used. When the fluid is in liquid form, it is preferable that the fluid has a viscosity of 0.2 cP to 1000 cP.

(Fluid Injecting Operation)

Next, with reference to FIGS. 2 to 5, an injection mode is described. The injection mode is an operating method for the fluid device 1 when the fluid device 1 injects fluid from the fluid chambers 19 and 20 to the target space E through the nozzles 24 and 25. In the injection mode, as described above, a high-pressure source with a generated pressure $P_H$ higher than the target space pressure $P_{tgt}$ and a feed flow rate $Q_H$ is used as the fluid pressure source 41. In the following descriptions, the first flow-passage system and the second flow-passage system are assumed to be filled with fluid. Unless otherwise specified, a potential energy and a pressure loss of the fluid are not considered.

Figure 2:
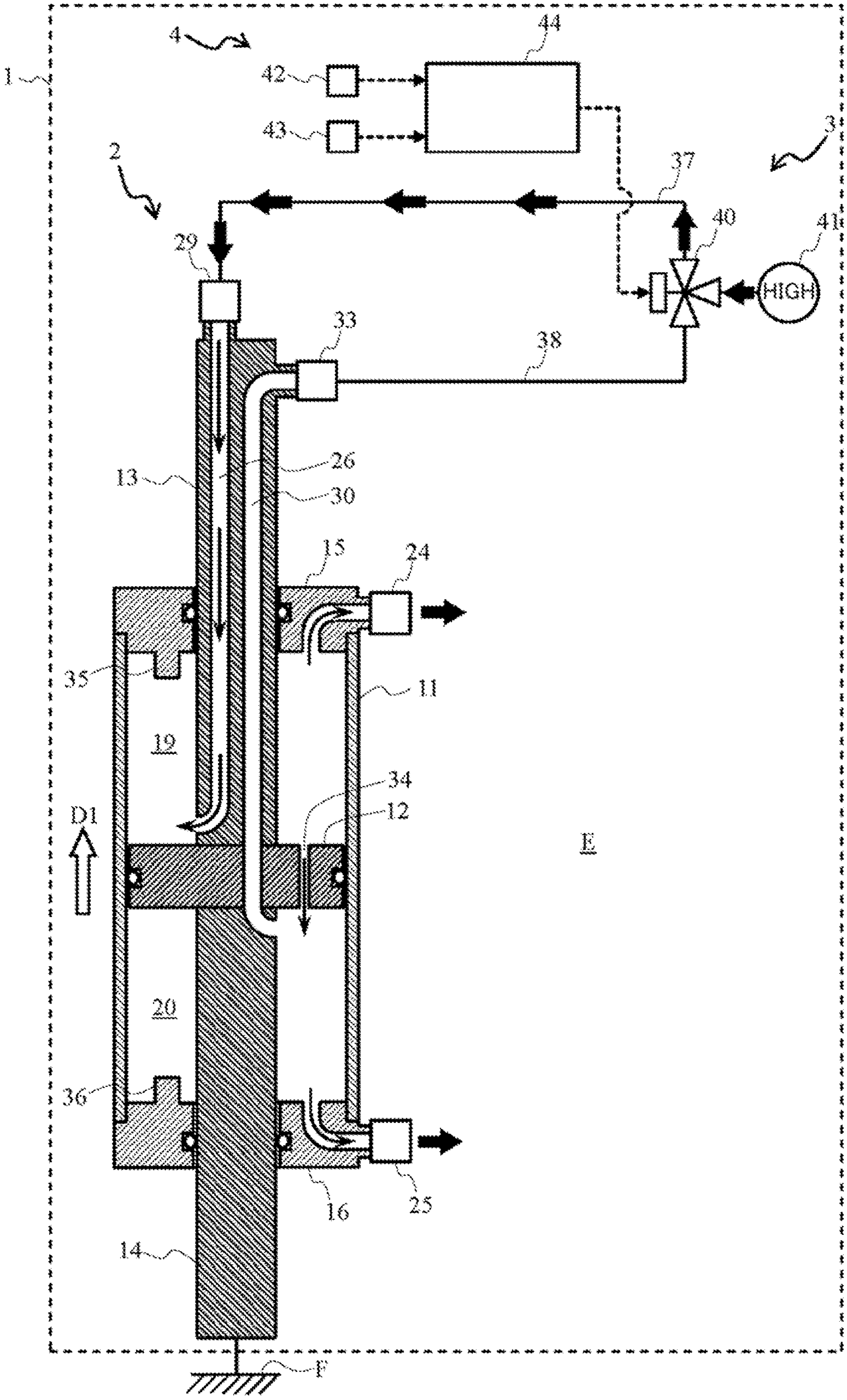
FIG. 2 is an explanatory diagram illustrating a movement state of a movable cylinder in a direction D1 in an injection mode.

FIG. 2 illustrates a state in which the movable cylinder 11 moves in the direction D1 in the injection mode. In this state, the controller 44 outputs, to the three-way solenoid valve, a control signal for closing its second port in order to move the movable cylinder 11 in the direction D1. The second port of the three-way solenoid valve is closed, so that the high-pressure source and the first external pipe 37 connect to and communicate with each other through the first port of the three-way solenoid valve. Consequently, fluid is fed from the high-pressure source to the first fluid chamber 19. When the fluid is fed from the high-pressure source to the first fluid chamber 19, the fluid in the first fluid chamber 19 is injected to the target space E through the first nozzle 24 due to the increase in internal pressure in the first fluid chamber 19. Simultaneously, the volume of the first fluid chamber 19 is increased to move the movable cylinder 11 in the direction D1. Then, the volume of the second fluid chamber 20 decreases, and consequently the fluid in the second fluid chamber 20 is injected to the target space E through the second nozzle 25.

The balance between forces applied to the movable cylinder 11 moving in the direction D1 at a given velocity $V_1$ in the injection mode is expressed as Equation (1) below by using the generated pressure $P_H$ from the high-pressure source, an internal pressure $P_{B1}$ in the second fluid chamber 20, a friction force R (>0), and the effective cylinder pressure-receiving area S. The left side of Equation (1) below represents a force applied to the movable cylinder 11 in the direction D1, while the right side thereof represents a force applied to the movable cylinder 11 in the direction D2. In Equation (1) below, the generated pressure $P_H$ from the high-pressure source is used as an internal pressure $P_{A1}$ in the first fluid chamber 19 without considering the pressure loss as describe above. A friction force $R_1$ is generated between the movable cylinder 11 and the piston 12 (or the sealing member 21) or between the closing member 15 (or the sealing member 17) and the guide 13 and between the closing member 16 (or the sealing member 18) and the guide 14.

$$P_H \times S = P_{B1} \times S + R_1 \quad (1)$$

A differential pressure $\Delta P_1$ ($=P_{A1}-P_{B1}$) between the internal pressure $P_{A1}$ in the first fluid chamber 19 and the internal pressure $P_{B1}$ in the second fluid chamber 20 is expressed as Equation (2) below by modifying Equation (1) described above, where the value of internal pressure $P_{A1}$ in the first fluid chamber 19 is equal to the value of generated pressure $P_H$ from the high-pressure source. It is understood from this equation that the internal pressure $P_{A1}$ in the first fluid chamber 19 becomes higher than the internal pressure $P_{B1}$ in the second fluid chamber 20 ($P_{A1}>P_{B1}$)

$$\Delta P_1 = P_{A1} - P_{B1} = R_1/S \quad (2)$$

The balance between the inflow rate and the outflow rate in the movable cylinder 11 is expressed as Equation (3) below by using the feed flow rate $Q_H$ of the high-pressure source, an injection flow rate $Q_{A1}$ of the first nozzle 24, and an injection flow rate $Q_{B1}$ of the second nozzle 25. The left side of Equation (3) below represents an inflow rate to the movable cylinder 11, while the right side thereof represents an outflow rate from the movable cylinder 11.

$$Q_H = Q_{A1} + Q_{B1} \quad (3)$$

The volume of the second fluid chamber 20 decreases at a volume decrease rate [$m^3/s$] represented as a value obtained by multiplying the velocity $V_1$ of the movable cylinder 11 by the effective cylinder pressure-receiving area S. However, since the internal pressure $P_{A1}$ in the first fluid chamber 19 is higher than the internal pressure $P_{B1}$ in the second fluid chamber 20, a minute flow rate $q_1$ (>0) of fluid flows from the first fluid chamber 19 into the second fluid chamber 20 through the orifice flow passage 34. This minute flow rate $q_1$ is determined according to the flow-passage cross-sectional area of the orifice flow passage 34, the differential pressure $\Delta P_1$ ($=P_{A1}-P_{B1}$) between before and after the orifice flow passage 34, and other factors. Since the second nozzle 25 injects a flow rate of fluid obtained by adding the volume decrease rate of the second fluid chamber 20 and the minute flow rate $q_1$, Equation (4) below holds for the injection flow rate $Q_{B1}$.

$$Q_{B1} = S \times V_1 + q_1 \quad (4)$$

Equation (4) described above is modified into Equation (5) below to obtain the velocity $V_1$ of the movable cylinder 11.

$$V_1 = (Q_{B1} - q_1)/S \quad (5)$$

Next, for the sake of understanding the effects of the fluid device 1 in the injection mode due to the orifice flow passage 34, descriptions are made on a relational expression that holds for the velocity of the movable cylinder 11, the injection flow rate of the first nozzle 24, and the injection flow rate of the second nozzle 25 in a case where the orifice flow passage 34 is not included.

Similarly to Equation (1) described above, the balance between forces applied to the movable cylinder 11 moving in the direction D1 at a given velocity $V_1'$ in the injection mode is expressed as Equation (6) below by using the generated pressure $P_H$ from the high-pressure source, an internal pressure $P_{B1}'$ in the second fluid chamber 20, a friction force $R_1'$, and the effective cylinder pressure-receiving area S. The left side of Equation (6) below represents a force applied to the movable cylinder 11 in the direction D1, while the right side thereof represents a force applied to the movable cylinder 11 in the direction D2.

$$P_H \times S = P_{B1}' \times S + R_1' \quad (6)$$

Similarly to Equation (3) described above, the balance between the inflow rate and the outflow rate in the movable cylinder 11 is expressed as Equation (7) below by using the feed flow rate $Q_H$ of the high-pressure source, an injection flow rate $Q_{A1}'$ of the first nozzle 24, and an injection flow rate $Q_{B1}'$ of the second nozzle 25. The left side of Equation (7) below represents an inflow rate to the movable cylinder 11, while the right side thereof represents an outflow rate from the movable cylinder 11.

$$Q_H = Q_{A1}' + Q_{B1}' \quad (7)$$

Similarly to the above, the volume of the second fluid chamber 20 decreases at a volume decrease rate [$m^3/s$] represented as a value obtained by multiplying the velocity $V_1'$ of the movable cylinder 11 by the effective cylinder pressure-receiving area S. However, in a case where the piston-cylinder mechanism 2 does not include the orifice flow passage 34, a fluid flow is not generated between the first fluid chamber 19 and the second fluid chamber 20. For this reason, since the second nozzle 25 injects the fluid at a flow rate equal to the volume decrease rate of the second fluid chamber 20, Equation (8) below holds for the injection flow rate $Q_{B1}'$.

$$Q_{B1}' = S \times V_1' \quad (8)$$

A friction force generated between the movable cylinder 11 and the piston 12 or between the closing member 15 and the guide 13 and between the closing member 16 and the guide 14 varies exactly according to the velocity of the movable cylinder 11. However, as a force applied to the movable cylinder 11 in the direction D2 (see the right side of Equations (1) and (6) described above), the internal pressures $P_{B1}$ and $P_{B1}'$ in the second fluid chamber 20 are more significantly dominant than the friction forces $R_1$ and $R_1'$. In view of that, in Equations (1) and (6) described above, the friction force $R_1'$ applied to the movable cylinder 11 moving at the velocity $V_1'$ and the friction force $R_1$ applied to the movable cylinder 11 moving at the velocity $V_1$ are regarded as an equal value ($R_1'=R_1$), and then Equation (9) below holds based on Equations (1) and (6) described above.

$$P_{B1}' = P_{B1} \quad (9)$$

Since the value of injection flow rate of the second nozzle 25 varies according to the differential pressure between the internal pressure in the second fluid chamber 20 and the target space pressure $P_{tgt}$, Equation (10) below holds where $P_{B1}'=P_{B1}$ as expressed by Equation (9) described above. It is understood from this equation that the injection flow rate $Q_B'$ of the second nozzle 25 when there is not the orifice flow passage 34 is equal to the injection flow rate $Q_B$ of the second nozzle 25 when there is the orifice flow passage 34.

$$Q_{B1}' = Q_{B1} \quad (10)$$

Equation (10) described above is substituted into Equation (8) described above and then Equation (8) is modified into Equation (11) below to obtain the velocity V' of the movable cylinder 11.

$$V_1' = Q_{B1}/S \quad (11)$$

Therefore, a velocity difference $\Delta V_1$ ($=V_1'-V_1$) between the velocity $V_1'$ of the movable cylinder 11 when there is not the orifice flow passage 34 and the velocity $V_1$ of the movable cylinder 11 when there is the orifice flow passage 34 is obtained by Equation (12) below based on Equations (5) and (11) described above. It is understood from this equation that the velocity V of the movable cylinder 11 when there is the orifice flow passage 34 is lower than the velocity V' of the movable cylinder 11 when there is not the orifice flow passage 34.

$$\Delta V_1 = V_1' - V_1 = q_1/S \quad (12)$$

Equation (13) below holds based on Equations (3), (7), and (10) described above. It is understood from this equation that the injection flow rate $Q_{A1}'$ of the first nozzle 24 when there is not the orifice flow passage 34 is equal to the injection flow rate $Q_{A1}$ of the first nozzle 24 when there is the orifice flow passage 34.

$$Q_{A1}' = Q_{A1} \quad (13)$$

The fluid device 1 includes the orifice flow passage 34 in the manner as described above, so that when the movable cylinder 11 moves in the direction D1 in the injection mode, the fluid device 1 can reduce the velocity of the movable cylinder 11, while preventing a decrease in the injection flow rate of the first nozzle 24 and the injection flow rate of the second nozzle 25.

Figure 3:
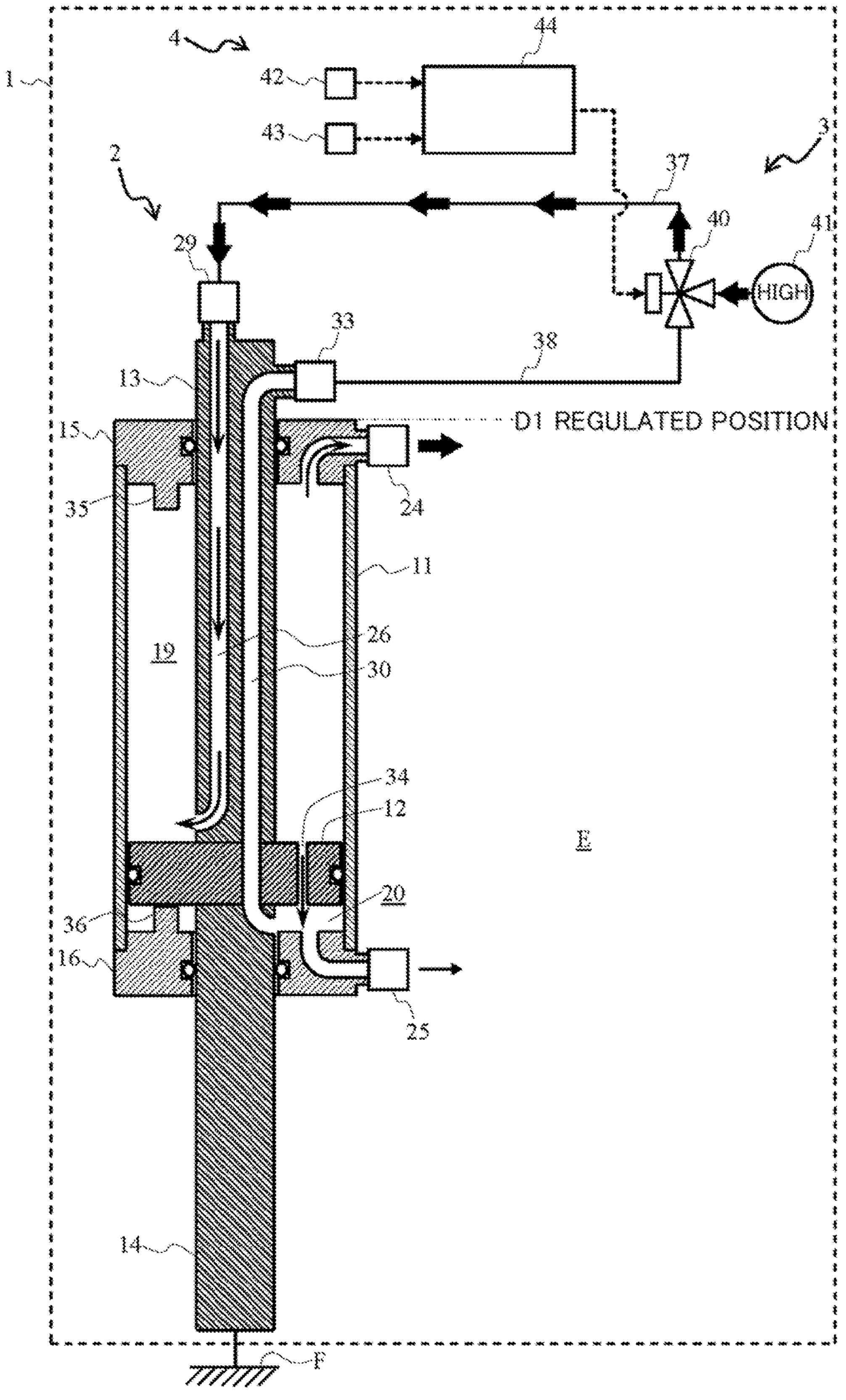
FIG. 3 is an explanatory diagram illustrating a D1 regulated state of the movable cylinder in the injection mode.

FIG. 3 illustrates the movable cylinder 11 in the D1 regulated state in the injection mode. In this state, the movable cylinder 11 stops at the D1 regulated position, so that the volume of the first fluid chamber 19 is maximized, while the volume of the second fluid chamber 20 is minimized, and then the volume changes stop. When the movable cylinder 11 stops at the D1 regulated position, initially fluid is still fed from the high-pressure source to the first fluid chamber 19, and accordingly the fluid injection from the first nozzle 24 continues. In contrast, since the volume change in the second fluid chamber 20 stops, a slight quantity of fluid that enters from the first fluid chamber 19 into the second fluid chamber 20 through the orifice flow passage 34 only flows out from the second nozzle 25 to the target space E.

When the controller 44 detects stop of the movable cylinder 11 at the D1 regulated position based on an output signal from the first proximity detector 42, the controller 44 outputs, to the three-way solenoid valve, a control signal for closing its first port in order to switch the movement direction of the movable cylinder 11 to the direction D2.

Figure 4:
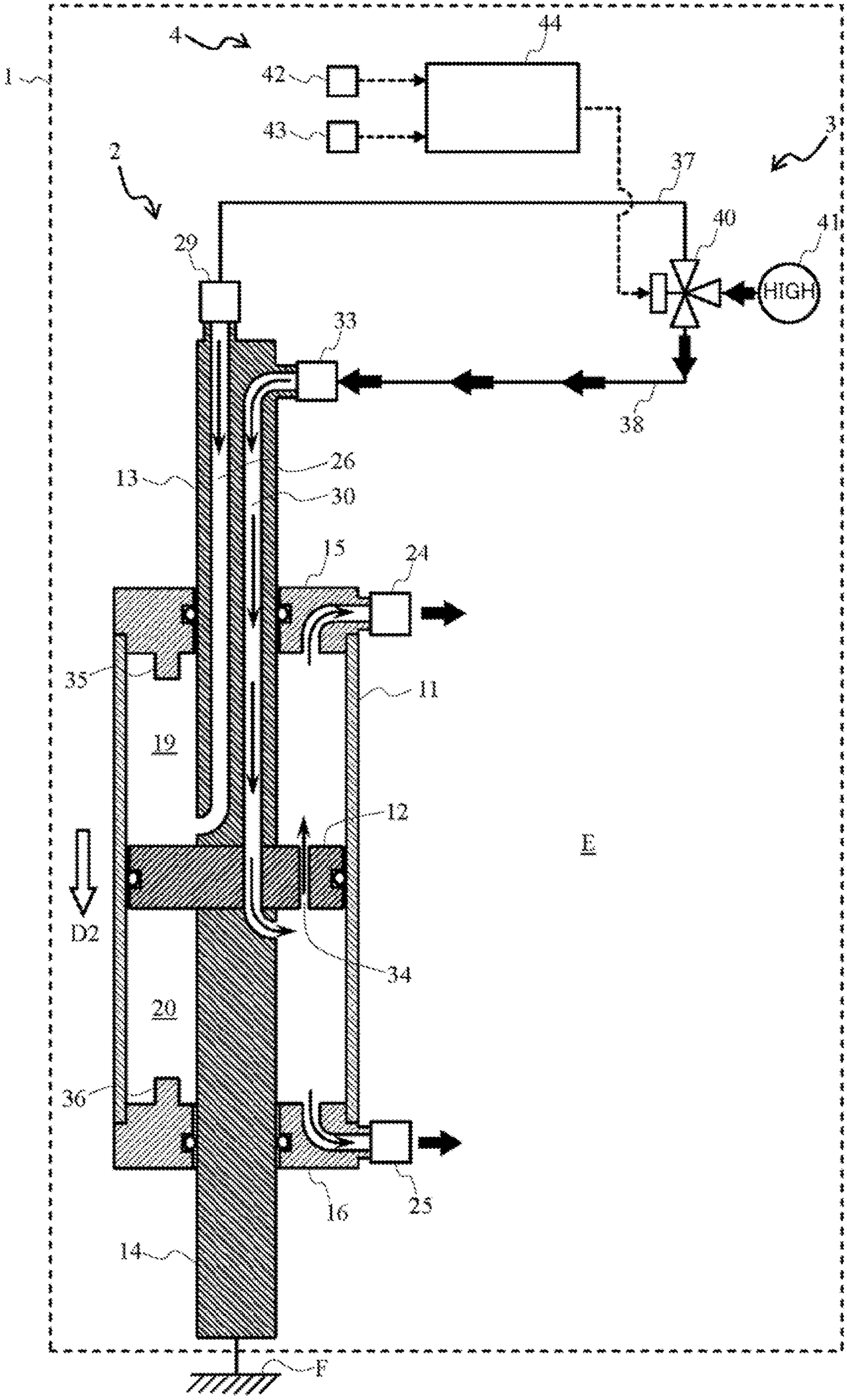
FIG. 4 is an explanatory diagram illustrating a movement state of the movable cylinder in a direction D2 in the injection mode.

FIG. 4 illustrates a state in which the movable cylinder 11 moves in the direction D2 in the injection mode. In this state, the controller 44 controls and closes the first port of the three-way solenoid valve, so that the high-pressure source and the second external pipe 38 connect to and communicate with each other through the second port of the three-way solenoid valve. Consequently, fluid is fed from the high-pressure source to the second fluid chamber 20. When the fluid is fed from the high-pressure source to the second fluid chamber 20, the fluid in the second fluid chamber 20 is injected to the target space E through the second nozzle 25 due to the increase in internal pressure $P_{B1}$ in the second fluid chamber 20. Simultaneously, the volume of the second fluid chamber 20 is increased to move the movable cylinder 11 in the direction D2. Then, as the volume of the first fluid chamber 19 decreases, the internal pressure $P_{A1}$ increases, and consequently the fluid in the first fluid chamber 19 is injected to the target space E through the first nozzle 24.

When the movable cylinder 11 moves in the direction D2 at a given velocity V, Equations (1) to (13) described above hold by a method as described below. That is, Equations (1) to (13) described above hold by interchanging the internal pressures $P_{A1}$ and $P_{A1}'$ in the first fluid chamber 19 and the internal pressures $P_{B1}$ and $P_{B1}'$ in the second fluid chamber 20, and by interchanging the injection flow quantities $Q_{A1}$ and $Q_{A1}'$ of the first nozzle 24 and the injection flow quantities $Q_{B1}$ and $Q_{B1}'$ of the second nozzle 25. Therefore, the fluid device 1 includes the orifice flow passage 34, and thus can reduce the velocity of the movable cylinder 11 in the direction D2, while preventing a decrease in the injection flow rate of the first nozzle 24 and the injection flow rate of the second nozzle 25.

Figure 5:
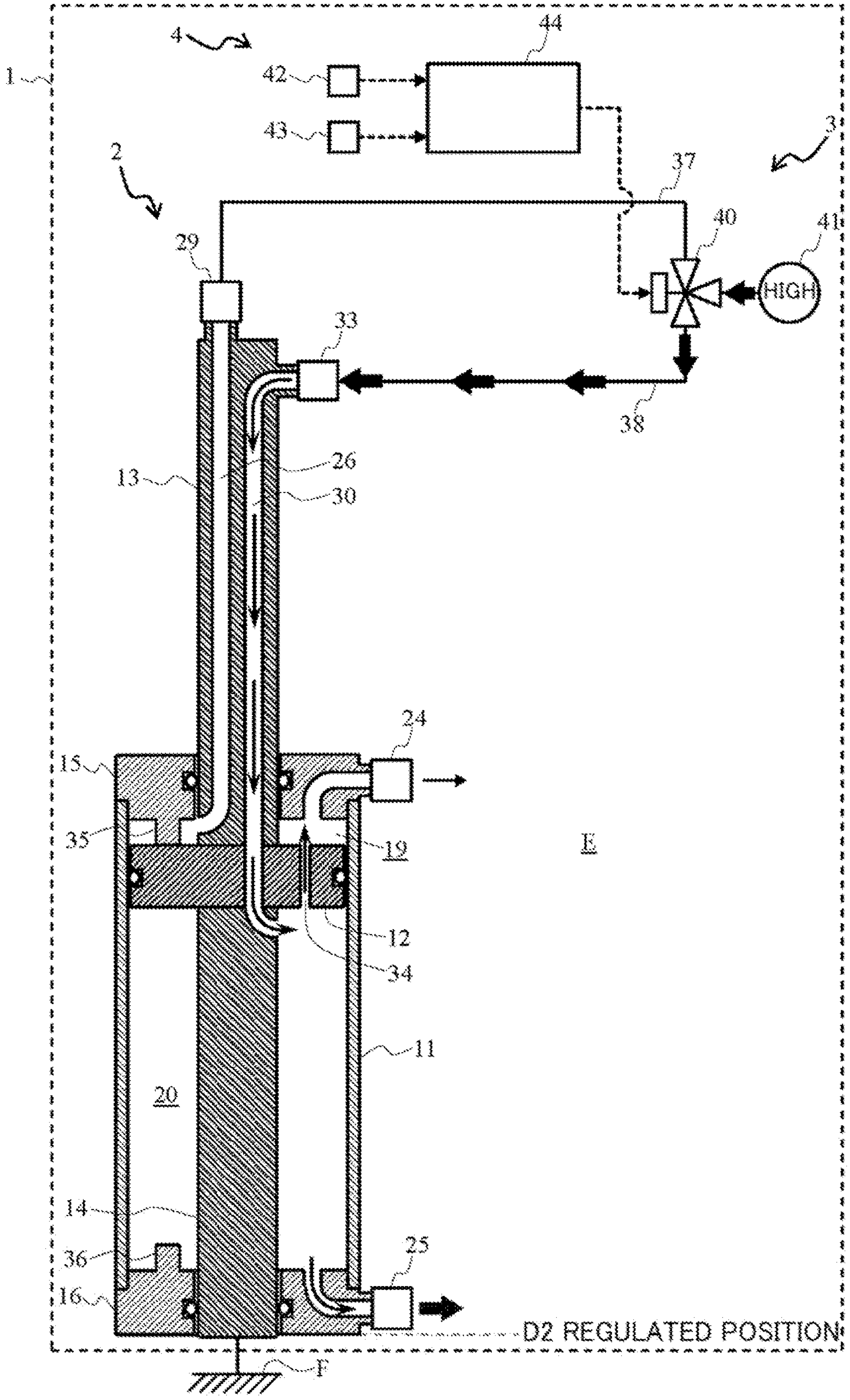
FIG. 5 is an explanatory diagram illustrating a D2 regulated state of the movable cylinder in the injection mode.

FIG. 5 illustrates the movable cylinder 11 in the D2 regulated state in the injection mode. In this state, the movable cylinder 11 stops at the D2 regulated position, so that the volume of the first fluid chamber 19 is minimized, while the volume of the second fluid chamber 20 is maximized, and then the volume changes stop. When the movable cylinder 11 stops at the D2 regulated position, initially fluid is still fed from the high-pressure source to the second fluid chamber 20, and accordingly the fluid injection from the second nozzle 25 continues. In contrast, since the volume change in the first fluid chamber 19 stops, a slight quantity of fluid that enters from the second fluid chamber 20 into the first fluid chamber 19 through the orifice flow passage 34 only flows out from the first nozzle 24 to the target space E.

When the controller 44 detects stop of the movable cylinder 11 at the D2 regulated position based on an output signal from the second proximity detector 43, the controller 44 outputs, to the three-way solenoid valve, a control signal for closing its second port in order to switch the movement direction of the movable cylinder 11 to the direction D1. With this operation, the movable cylinder 11 moves in the direction D1 again as illustrated in FIG. 2.

(Fluid Suctioning Operation)

Next, with reference to FIGS. 6 to 9, a suction mode is described. The suction mode is an operating method for the fluid device 1 when the fluid device 1 suctions fluid from the target space E into the fluid chambers 19 and 20 through the nozzles 24 and 25. In the suction mode, as described above, a low-pressure source with a generated pressure $P_L$ lower than the target space pressure $P_{tgt}$ and a suction flow rate $Q_L$ is used as the fluid pressure source 41.

Figure 6:
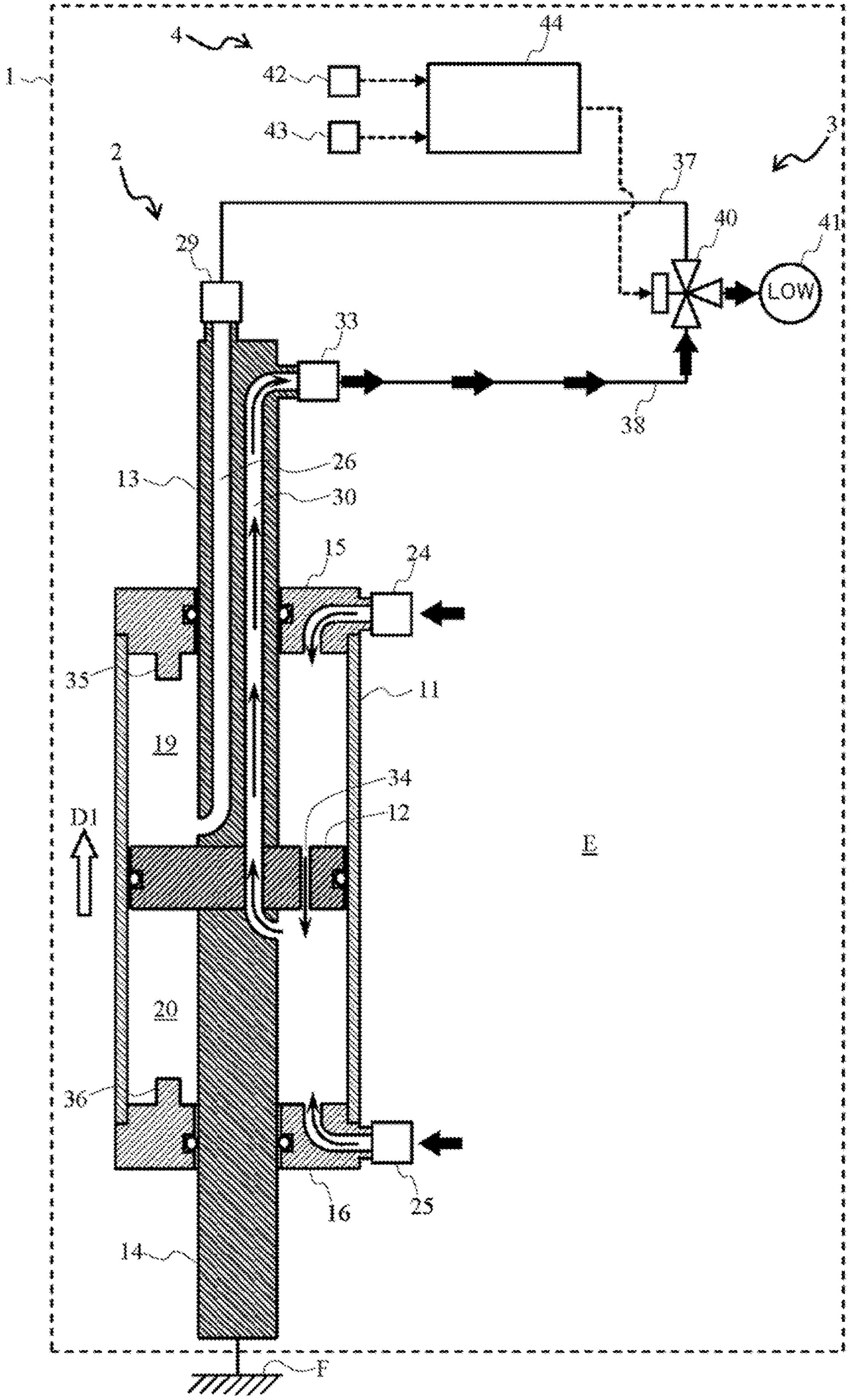
FIG. 6 is an explanatory diagram illustrating a movement state of the movable cylinder in the direction D1 in a suction mode.

FIG. 6 illustrates a state in which the movable cylinder 11 moves in the direction D1 in the suction mode. In this state, the controller 44 outputs, to the three-way solenoid valve, a control signal for closing its first port. The first port of the three-way solenoid valve is closed, so that the low-pressure source and the second external pipe 38 connect to and communicate with each other through the second port of the three-way solenoid valve. Consequently, the fluid is suctioned from the second fluid chamber 20 into the low-pressure source. When the fluid is suctioned from the second fluid chamber 20 into the low-pressure source, the fluid in the target space E is suctioned into the second fluid chamber 20 through the second nozzle 25 due to the decrease in internal pressure in the second fluid chamber 20. Simultaneously, the volume of the second fluid chamber 20 is decreased to move the movable cylinder 11 in the direction D1. Then, the volume of the first fluid chamber 19 increases, and consequently the fluid in the target space E is suctioned into the first fluid chamber 19 through the first nozzle 24.

The balance between forces applied to the movable cylinder 11 moving in the direction D1 at a given velocity $V_2$ in the suction mode is expressed as Equation (14) below by using the generated pressure $P_L$ from the low-pressure source, an internal pressure $P_{A2}$ in the first fluid chamber 19, a friction force $R_2$ (>0), and the effective cylinder pressure-receiving area S. The left side of Equation (14) below represents a force applied to the movable cylinder 11 in the direction D1, while the right side thereof represents a force applied to the movable cylinder 11 in the direction D2. In Equation (14) below, the generated pressure $P_L$ from the low-pressure source is used as an internal pressure $P_{B2}$ in the second fluid chamber 20 without considering the pressure loss as described above.

$$P_{A2}\times S=P_L\times S+R_2 \tag{14}$$

A differential pressure $\Delta P_2$ ($=P_{A2}-P_{B2}$) between the internal pressure $P_{A2}$ in the first fluid chamber 19 and the internal pressure $P_{B2}$ in the second fluid chamber 20 is expressed as Equation (15) below by modifying Equation (14) described above, where the value of internal pressure $P_{B2}$ in the second fluid chamber 20 is equal to the value of generated pressure $P_L$ from the low-pressure source. It is understood from this equation that the internal pressure $P_{A2}$ in the first fluid chamber 19 becomes higher than the internal pressure $P_{B2}$ in the second fluid chamber 20 ($P_{A2}>P_{B2}$)

$$\Delta P_2=P_{A2}-P_{B2}=R_2/S \tag{15}$$

The balance between the inflow rate and the outflow rate in the movable cylinder 11 is expressed as Equation (16) below by using the suction flow rate $Q_L$ of the low-pressure source, a suction flow rate $Q_{A2}$ of the first nozzle 24, and a suction flow rate $Q_{B2}$ of the second nozzle 25. The left side of Equation (16) below represents an outflow rate from the movable cylinder 11, while the right side thereof represents an inflow rate to the movable cylinder 11.

$$Q_L=Q_{A2}+Q_{B2} \tag{16}$$

The volume of the first fluid chamber 19 increases at a volume increase rate [$m^3/s$] represented as a value obtained by multiplying the velocity $V_2$ of the movable cylinder 11 by the effective cylinder pressure-receiving area S. However, since the internal pressure $P_{A2}$ in the first fluid chamber 19 is higher than the internal pressure $P_{B2}$ in the second fluid chamber 20, a minute flow rate $q_2$ (>0) of fluid flows from the first fluid chamber 19 into the second fluid chamber 20 through the orifice flow passage 34. This minute flow rate $q_2$ is determined according to the flow-passage cross-sectional area of the orifice flow passage 34, the differential pressure $\Delta P_2$ ($=P_{A2}-P_{B2}$) between before and after the orifice flow passage 34. Since the first nozzle 24 suctions a flow rate of fluid obtained by adding the volume increase rate of the first fluid chamber 19 and the minute flow rate $q_2$, Equation (17) below holds for the suction flow rate $Q_{A2}$.

$$Q_{A2}=S\times V_2+q_2 \tag{17}$$

Equation (17) described above is modified into Equation (18) below to obtain the velocity $V_2$ of the movable cylinder 11.

$$V_2=(Q_{A2}-q_2)/S \quad (18)$$

Next, for the sake of understanding the effects of the fluid device 1 in the suction mode due to the orifice flow passage 34, descriptions are made on a relational expression that holds for the velocity of the movable cylinder 11, the suction flow rate of the first nozzle 24, and the suction flow rate of the second nozzle 25 in a case where the orifice flow passage 34 is not provided.

Similarly to Equation (14) described above, the balance between forces applied to the movable cylinder 11 moving in the direction D1 at a given velocity $V_2'$ in the suction mode is expressed as Equation (19) below by using the generated pressure $P_L$ from the low-pressure source, an internal pressure $P_{A2}'$ in the first fluid chamber 19, a friction force $R_2'$, and the effective cylinder pressure-receiving area S.

$$P_{A2}'\times S=P_L\times S+R_2' \quad (19)$$

Similarly to Equation (16) described above, the balance between the inflow rate and the outflow rate in the movable cylinder 11 is expressed as Equation (20) below by using the suction flow rate $Q_L$ of the low-pressure source, a suction flow rate $Q_{A2}'$ of the first nozzle 24, and a suction flow rate $Q_{B2}'$ of the second nozzle 25.

$$Q_L=Q_{A2}'+Q_{B2}' \quad (20)$$

Similarly to the above, the volume of the first fluid chamber 19 increases at a volume increase rate [$m^3/s$] represented as a value obtained by multiplying the velocity $V_2'$ of the movable cylinder 11 by the effective cylinder pressure-receiving area S. In contrast, since the piston-cylinder mechanism 2 does not include the orifice flow passage 34, a fluid flow is not generated between the first fluid chamber 19 and the second fluid chamber 20. For this reason, since the first nozzle 24 suctions the fluid at a flow rate equal to the volume increase rate of the first fluid chamber 19, Equation (21) below holds for the suction flow rate $Q_{A2}'$.

$$Q_{A2}'=S\times V_2' \quad (21)$$

As explained above, in Equations (14) and (19) described above, the friction force $R_2'$ applied to the movable cylinder 11 moving at the velocity $V_2'$ and the friction force $R_2$ applied to the movable cylinder 11 moving at the velocity $V_2$ are regarded as an equal value ($R_2'=R_2$), and then Equation (22) below holds based on Equations (14) and (19) described above.

$$P_{A2}'=P_{A2} \quad (22)$$

Since the suction flow rate of the first nozzle 24 becomes a value according to the differential pressure between the internal pressure in the first fluid chamber 19 and the target space pressure $P_{tgt}$, Equation (23) below holds where $P_{A2}'=P_{A2}$ as expressed by Equation (22) described above. It is understood from this equation that the suction flow rate $Q_{A2}'$ of the first nozzle 24 when there is not the orifice flow passage 34 is equal to the suction flow rate $Q_{A2}$ of the first nozzle 24 when there is the orifice flow passage 34.

$$Q_{A2}'=Q_{A2} \quad (23)$$

Equation (23) described above is substituted into Equation (20) described above and then Equation (20) is modified into Equation (24) below to obtain the velocity $V_2'$ of the movable cylinder 11.

$$V_2'=Q_{A2}/S \quad (24)$$

Therefore, a velocity difference $\Delta V_2$ ($=V_2'-V_2$) between the velocity $V_2'$ of the movable cylinder 11 when there is not the orifice flow passage 34 and the velocity $V_2$ of the movable cylinder 11 when there is the orifice flow passage 34 is obtained by Equation (25) below based on Equations (18) and (24) described above. It is understood from this equation that the velocity $V_2$ of the movable cylinder 11 when there is the orifice flow passage 34 is lower than the velocity $V_2'$ of the movable cylinder 11 when there is not the orifice flow passage 34.

$$\Delta V_2=V_2'-V_2=q_2/S \quad (25)$$

Equation (26) below holds based on Equations (16), (20), and (23) described above. It is understood from this equation that the suction flow rate $Q_{B2}'$ of the second nozzle 25 when there is not the orifice flow passage 34 is equal to the suction flow rate $Q_{B2}$ of the second nozzle 25 when there is the orifice flow passage 34.

$$Q_{B2}'=Q_{B2} \quad (26)$$

The fluid device 1 includes the orifice flow passage 34 in the manner as described above, so that when the movable cylinder 11 moves in the direction D1 in the suction mode, the fluid device 1 can reduce the velocity of the movable cylinder 11, while preventing a decrease in the suction flow rate of the first nozzle 24 and the suction flow rate of the second nozzle 25.

Figure 7:
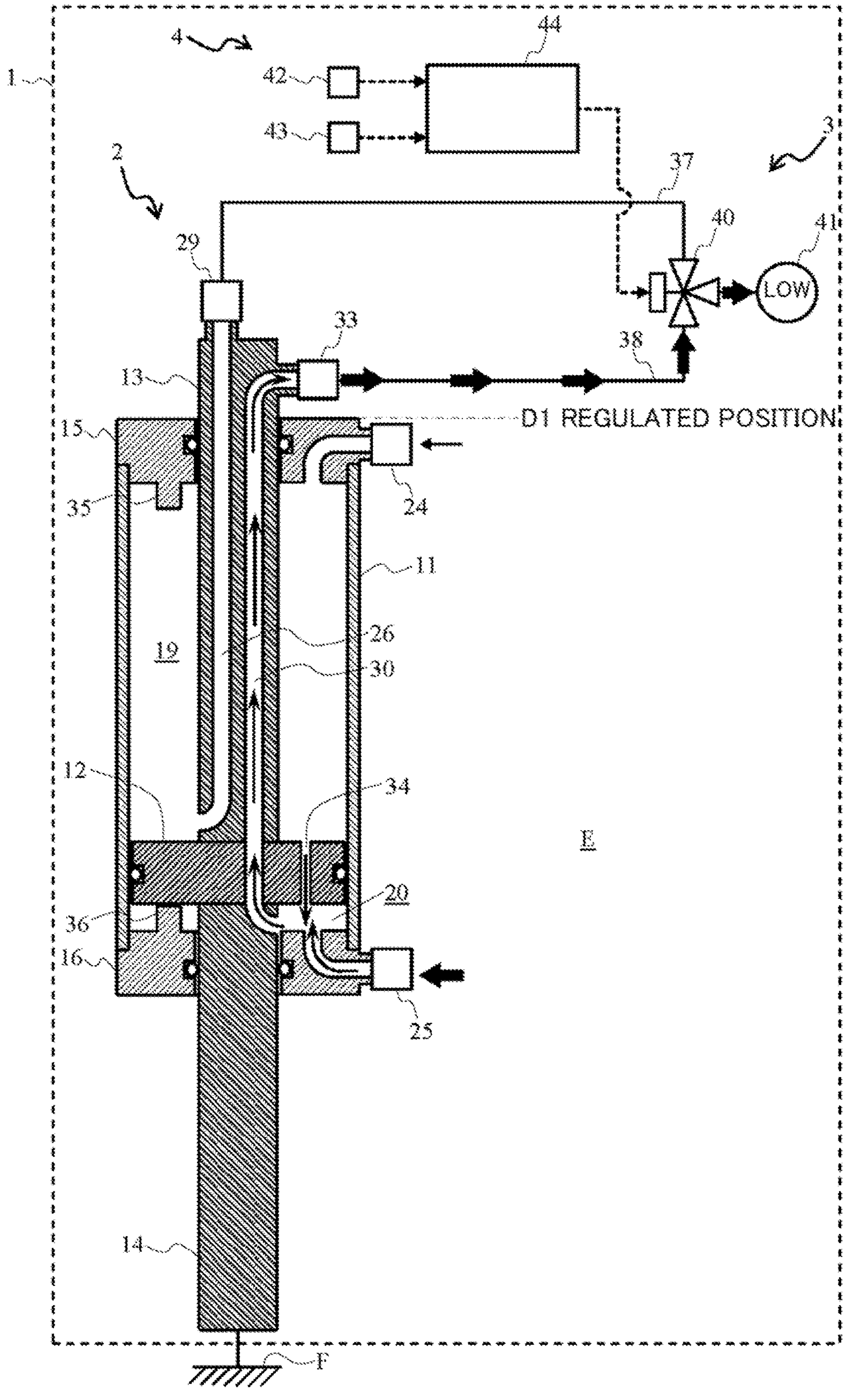
FIG. 7 is an explanatory diagram illustrating the D1 regulated state of the movable cylinder in the suction mode.

FIG. 7 illustrates the movable cylinder 11 in the D1 regulated state in the suction mode. In this state, the movable cylinder 11 stops at the D1 regulated position, so that the volume of the first fluid chamber 19 is maximized, while the volume of the second fluid chamber 20 is minimized, and then the volume changes stop. When the movable cylinder 11 stops at the D1 regulated position, initially fluid is still suctioned from the second fluid chamber 20 to the low-pressure source, and accordingly the fluid suction through the second nozzle 25 continues. In contrast, since the volume change in the first fluid chamber 19 stops, a slight quantity of fluid to flow out from the first fluid chamber 19 into the second fluid chamber 20 through the orifice flow passage 34 only enters from the target space E into the first fluid chamber 19 through the first nozzle 24.

When the controller 44 detects stop of the movable cylinder 11 at the D1 regulated position based on an output signal from the first proximity detector 42, the controller 44 outputs, to the three-way solenoid valve, a control signal for closing its second port in order to switch the movement direction of the movable cylinder 11 to the direction D2.

Figure 8:
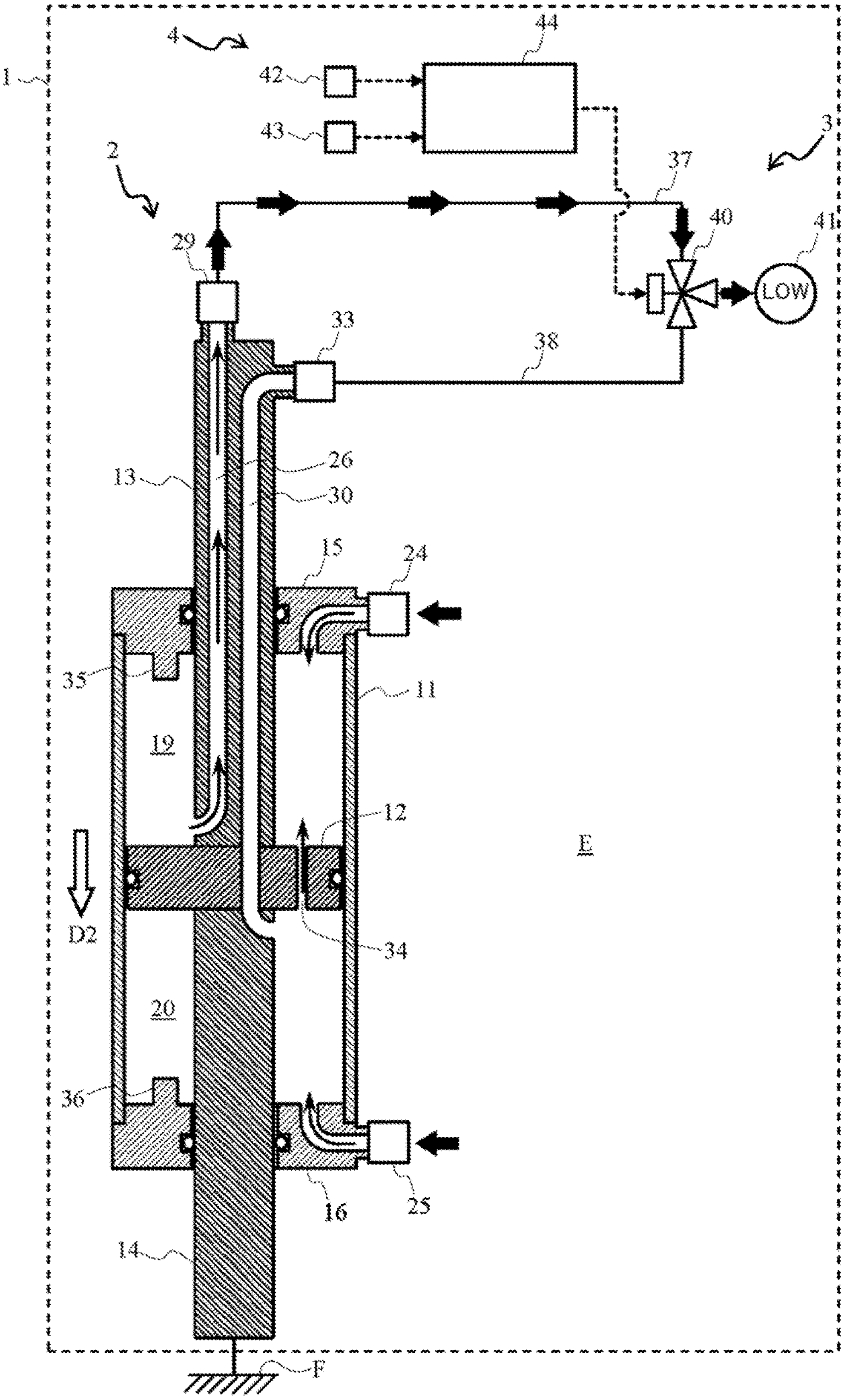
FIG. 8 is an explanatory diagram illustrating a movement state of the movable cylinder in the direction D2 in the suction mode.

FIG. 8 illustrates a state in which the movable cylinder 11 moves in the direction D2 in the suction mode. In this state, the controller 44 controls and closes the second port of the three-way solenoid valve, so that the low-pressure source and the first external pipe 37 connect to and communicate with each other through the first port of the three-way solenoid valve. Consequently, fluid is suctioned from the first fluid chamber 19 into the low-pressure source. When the fluid is suctioned from the first fluid chamber 19 into the low-pressure source, the fluid in the target space E is suctioned into the first fluid chamber 19 through the first nozzle 24 due to the decrease in internal pressure $P_{A2}$ in the first fluid chamber 19. Simultaneously, the volume of the first fluid chamber 19 is decreased to move the movable cylinder 11 in the direction D2. Then, as the volume of the second fluid chamber 20 increases, the internal pressure $P_{B2}$ decreases, and consequently the fluid in the target space E is suctioned into the second fluid chamber 20 through the second nozzle 25.

When the movable cylinder 11 moves in the direction D2 at the given velocity $V_2$, Equations (14) to (26) described above hold by a method as described below. That is, Equations (14) to (26) described above hold by interchanging the internal pressures $P_{A2}$ and $P_{A2}'$ in the first fluid chamber 19 and the internal pressures $P_{B2}$ and $P_{B2}'$ in the second fluid chamber 20, and by interchanging the suction flow quantities $Q_{A2}$ and $Q_{A2}'$ of the first nozzle 24 and the suction flow quantities $Q_{B2}$ and $Q_{B2}'$ of the second nozzle 25. Therefore, the fluid device 1 includes the orifice flow passage 34, and thus can reduce the velocity of the movable cylinder 11 in the direction D2, while preventing a decrease in the suction flow rate of the first nozzle 24 and the suction flow rate of the second nozzle 25.

Figure 9:
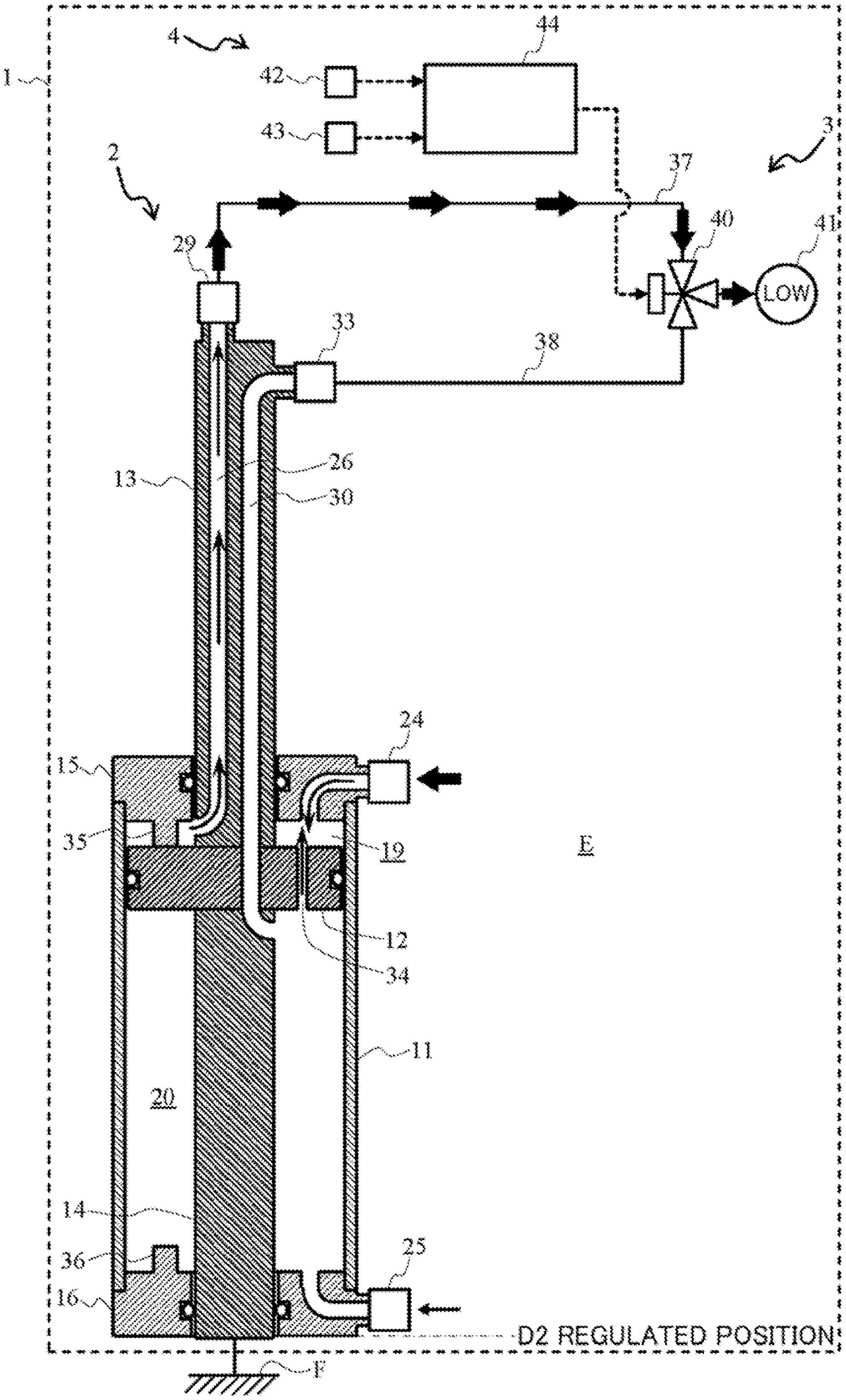
FIG. 9 is an explanatory diagram illustrating the D2 regulated state of the movable cylinder in the suction mode.

FIG. 9 illustrates the movable cylinder 11 in the D2 regulated state in the suction mode. In this state, the movable cylinder 11 stops at the D2 regulated position, so that the volume of the first fluid chamber 19 is minimized, while the volume of the second fluid chamber 20 is maximized, and then the volume changes stop. When the movable cylinder 11 stops at the D2 regulated position, initially fluid is still suctioned from the first fluid chamber 19 to the low-pressure source, and accordingly the fluid suction through the first nozzle 24 continues. In contrast, since the volume change in the second fluid chamber 20 stops, a slight quantity of fluid to flow out from the second fluid chamber 20 into the first fluid chamber 19 through the orifice flow passage 34 only enters from the target space E into the second fluid chamber 20 through the second nozzle 25.

When the controller 44 detects stop of the movable cylinder 11 at the D2 regulated position based on an output signal from the second proximity detector 43, the controller 44 outputs, to the three-way solenoid valve, a control signal for closing its first port in order to switch the movement direction of the movable cylinder 11 to the direction D1. With this operation, the movable cylinder 11 moves in the direction D1 again as illustrated in FIG. 6.

Second Embodiment

Figure 10:
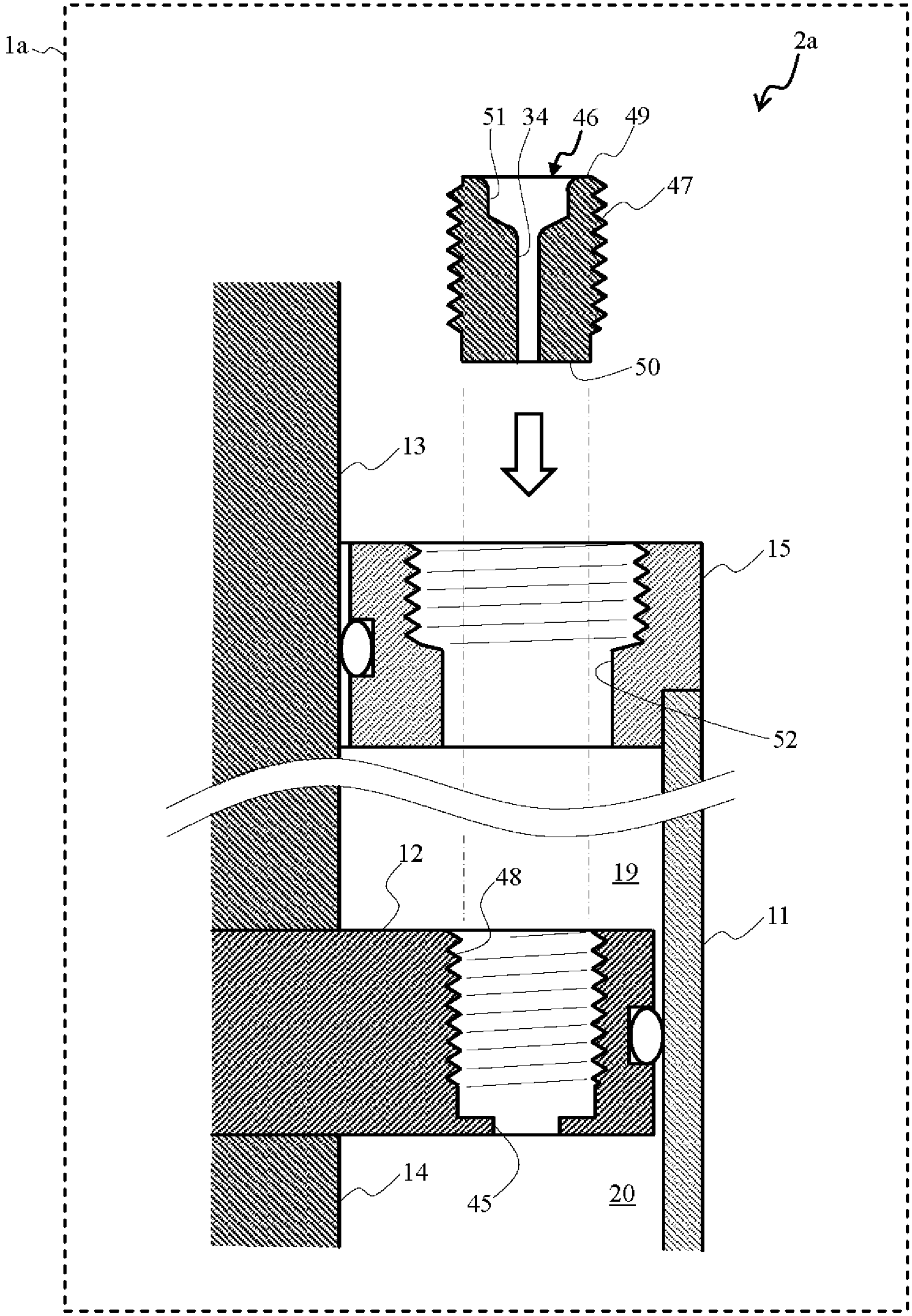
FIG. 10 is cross-sectional view schematically illustrating relevant parts of a fluid injection or suction device according to a second embodiment.
Figure 11:
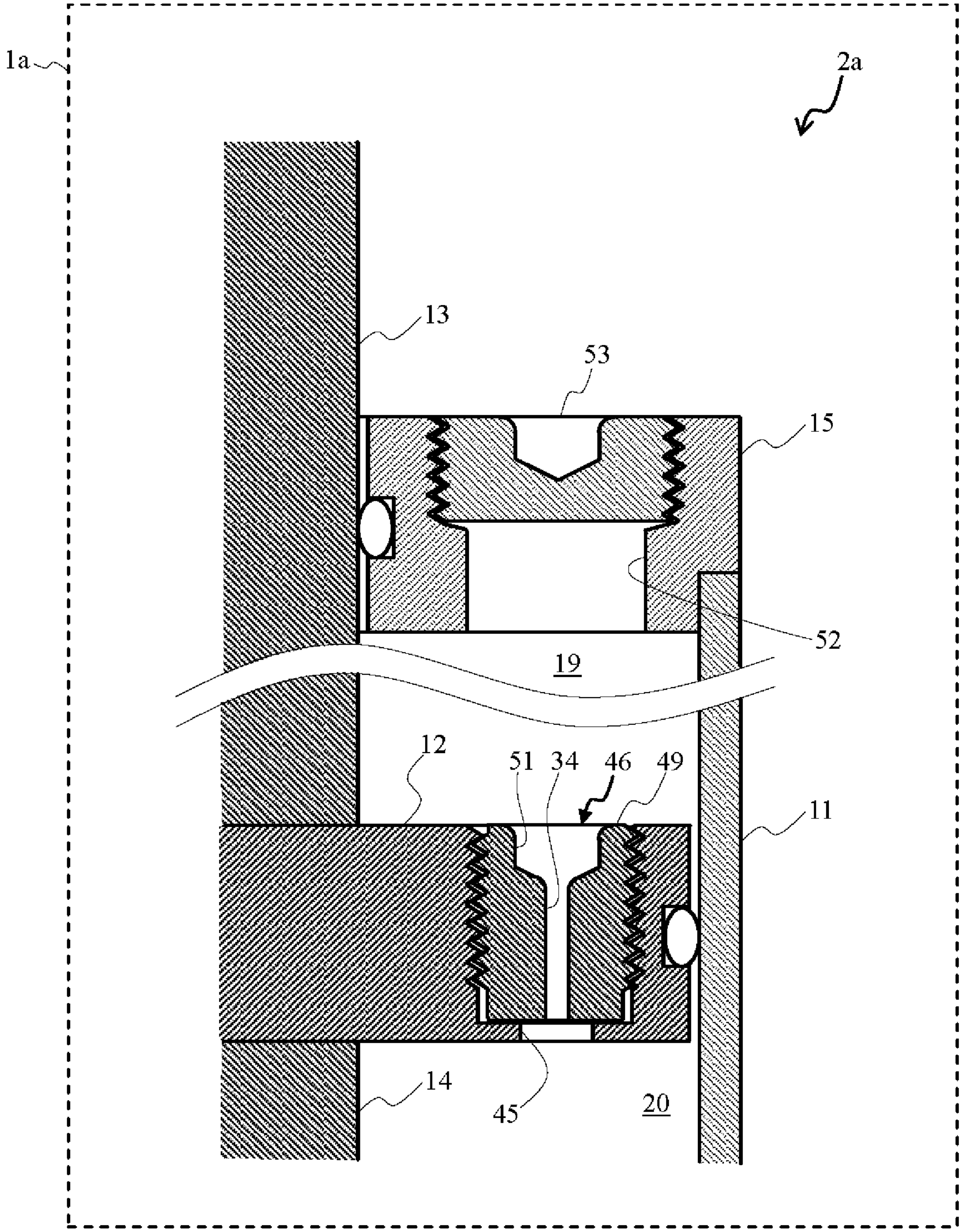
FIG. 11 is a cross-sectional view of the present device in a plug-fitted state.

With reference to FIGS. 10 and 11, a fluid device according to a second embodiment is described. A fluid device **1*a* according to the present embodiment has configurations identical to those of the fluid device 1** according to the first embodiment except for some parts thereof, and therefore such identical configurations are denoted by like reference signs and explanations thereof are omitted or simplified. The same holds true for the subsequent embodiments.

As illustrated in FIGS. 10 and 11, a piston-cylinder mechanism **2*a* of the fluid device 1*a* is different from the piston-cylinder mechanism 2 in that a through hole 45 is drilled in the piston 12, penetrating from a portion of the piston 12 facing the first fluid chamber 19 to a portion of the piston 12 facing the second fluid chamber 20, and a separate plug 46 with the orifice flow passage 34 formed therein is removably fitted into this through hole 45. FIG. 10 illustrates relevant parts of the piston-cylinder mechanism 2*a* before the plug is fitted. FIG. 11 illustrates the relevant parts of the piston-cylinder mechanism 2*a*** in a plug-fitted state.

In the specific examples in FIGS. 10 and 11, the plug 46 with a substantially columnar shape is screwed and fitted into the through hole 45 with a circular cross-sectional shape. The plug 46 is removable from the through hole 45 by screwing a male thread 47, formed on the outer circumferential surface of the plug 46 in a spiral shape about the axis of screwing rotation of the plug 46, in or out of a female thread 48 formed on the inner circumferential surface of the through hole 45 with a substantially circular cross-sectional shape. The orifice flow passage 34 is formed between opposite end faces 49 and 50 of the plug 46 in its axial direction. With the plug 46 screw-fitted into the through hole 45, the first fluid chamber 19 and the second fluid chamber 20 communicate with each other through the orifice flow passage 34.

A fit groove 51 is formed into a recess on an end face 49 that is one of the opposite end faces 49 and 50 of the plug 46 in its axial direction, and that faces the first fluid chamber 19 (hereinafter, referred to as "first end face"). The fit groove 51 is an engagement portion into which a tip end portion of an axial tool is fitted to transmit an axial rotation force of the axial tool so as to rotate the plug 46 to be screwed in the through hole 45 or screwed out of the through hole 45. The fit groove 51 has a cross-sectional shape that matches the shape of the tip end portion of the axial tool to be used. For example, the fit groove 51 is a hexagonal hole in which a tip end portion of a hexagonal bar spanner serving as the axial tool is fitted, or a recessed groove in which a tip end portion of a flathead screwdriver serving as the axial tool is fitted. The orifice flow passage 34 can be provided without interfering with the fit groove 51. However, unless there is an adequate areal margin on the first end face 49, the orifice flow passage 34 may be provided in the manner as described below. That is, as illustrated in FIGS. 10 and 11, the orifice flow passage 34 may extend from a bottom portion of the fit groove 51, for example, a bottom portion of the hexagonal hole into which the tip end portion of the hexagonal bar spanner is fitted, to the end face 50 facing the second fluid chamber 20 (hereinafter, referred to as "second end face").

A work through hole 52 is drilled in the first closing member 15 that is opposite to the first end face 49 of the plug 46 screw-fitted into the through hole 45 with respect to the first fluid chamber 19. The work through hole 52 is used at the time of replacement of the plug 46. The plug 46 is inserted through the work through hole 52 with the tip end portion of the axial tool fitted in the fit groove 51 of the plug 46, and thereby it is possible to screw-fit the plug 46 in the through hole 45. Except during replacement of the plug 46, the work through hole 52 is closed by screw-fitting a normally-closed lid 53 therein or by other means.

Based on Equations (12) and (25) described above, the velocity reduction amount of the movable cylinder 11 is set according to the values of minute flow quantities $q_1$ and $q_2$ of the orifice flow passage 34, while the values of minute flow quantities $q_1$ and $q_2$ vary according to the flow-passage cross-sectional area of the orifice flow passage 34. Therefore, provided that a plurality of plugs 46 are prepared in advance, and the orifice flow passages 34 of these plugs 46 are formed in various flow-passage cross-sectional areas, then a plug 46 having an appropriate flow-passage cross-sectional area is selected from among these plugs 46 and fitted into the through hole 45, so that the velocity of the movable cylinder 11 can be reduced by a desired reduction amount.

Figure 12:
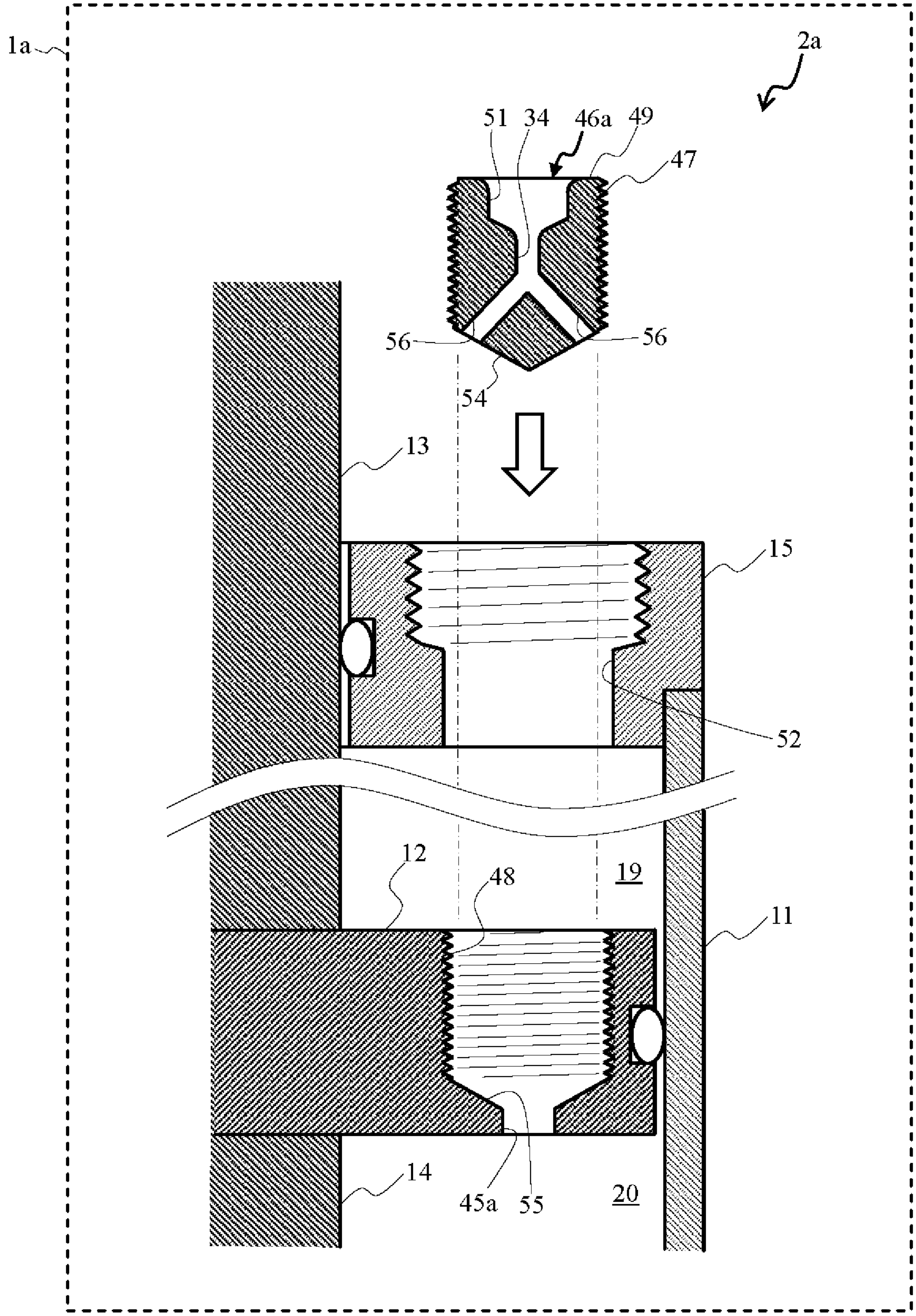
FIG. 12 is a cross-sectional view schematically illustrating a first modification of the present device.
Figure 13:
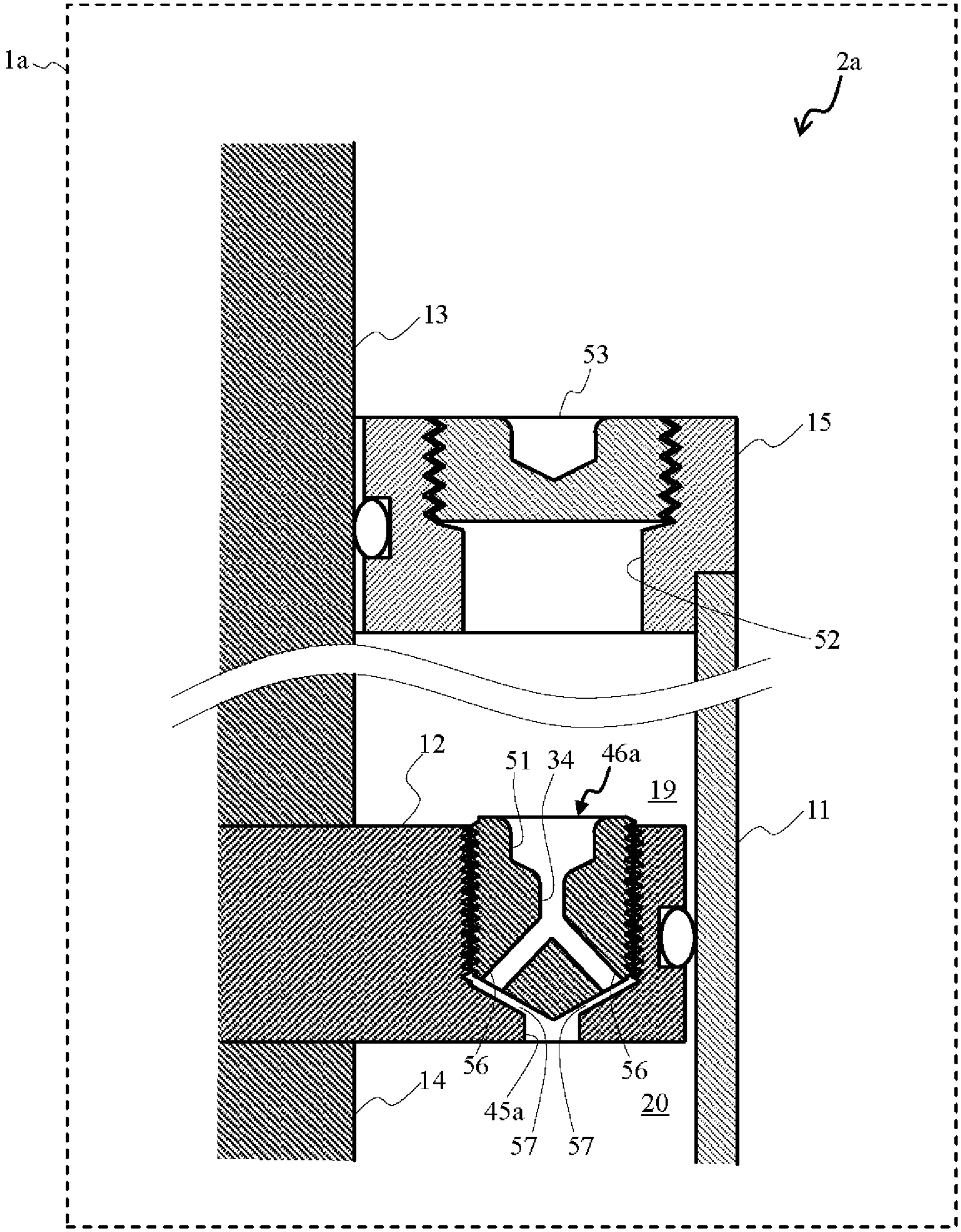
FIG. 13 is a cross-sectional view illustrating a plug-fitted state in the first modification.

Next, with reference to FIGS. 12 and 13, a first modification of the piston-cylinder mechanism **2*a* in FIGS. 10 and 11 is described. FIG. 12 illustrates relevant parts of the piston-cylinder mechanism 2*a* before the plug is fitted. FIG. 13 illustrates the relevant parts of the piston-cylinder mechanism 2*a* in a plug-fitted state. A plug 46*a* in the present modification is different from the plug 46 in that the second end face 50 of the plug 46 described above has a conical face 54 that bulges into a conical shape or a truncated conical shape coaxial with the axis. A through hole 45***a* in the present modification is also different from the through hole 45 in that the through hole 45*a* includes an opposed conical face 55 as a portion of its inner circumferential surface. The opposed conical face 55 is opposed to the conical face 54 of the plug 46*a* when the plug 46*a* is screw-fitted into the through hole 45*a*. The opposed conical face 55 also has a shape extending along the shape of the conical face 54 of the plug 46*a*.

An opening 56 of the orifice flow passage 34 in the plug 46*a*, which is open toward the second fluid chamber 20, is formed so as to face a gap 57 formed between the conical face 54 and the opposed conical face 55 when the plug 46*a* is screw-fitted into the through hole 45*a*. With this configuration, the gap 57 formed between the conical face 54 and the opposed conical face 55 forms a portion of the orifice flow passage 34. A plurality of openings 56 that are open toward the second fluid chamber 20 may be formed. In this case, as illustrated in the drawings, the orifice flow passage 34 may branch off into multiple paths inside the plug 46*a* and the multiple paths may be connected to the respective openings 56, or the respective openings 56 may individually have the orifice flow passage 34.

The minute flow quantities $q_1$ and $q_2$ of fluid flows between the first fluid chamber 19 and the second fluid chamber 20 through the orifice flow passage 34 in the plug 46*a* including the gap 57. The spacing of the gap 57 varies according to the screwing amount of the male thread 47 of the plug 46*a* relative to the female thread 48 on the through hole 45*a*. With this configuration, the orifice flow passage 34 has a variable throttle valve that serves as a throttle unit and that uses the spacing of the gap 57 as a throttle opening of the flow passage. Therefore, the plug 46*a* enables the velocity of the movable cylinder 11 to be reduced by a desired reduction amount by adjusting the screwing amount described above. This can eliminate the necessity for replacement of the plug. Since the orifice flow passage 34 is provided with the variable throttle valve obtained by using the gap 57, the orifice flow passage 34 from which an orifice is omitted may simply serve as a short-circuit flow passage connecting (short-circuiting) the first fluid chamber 19 and the second fluid chamber 20 so as to communicate with each other.

Figure 14:
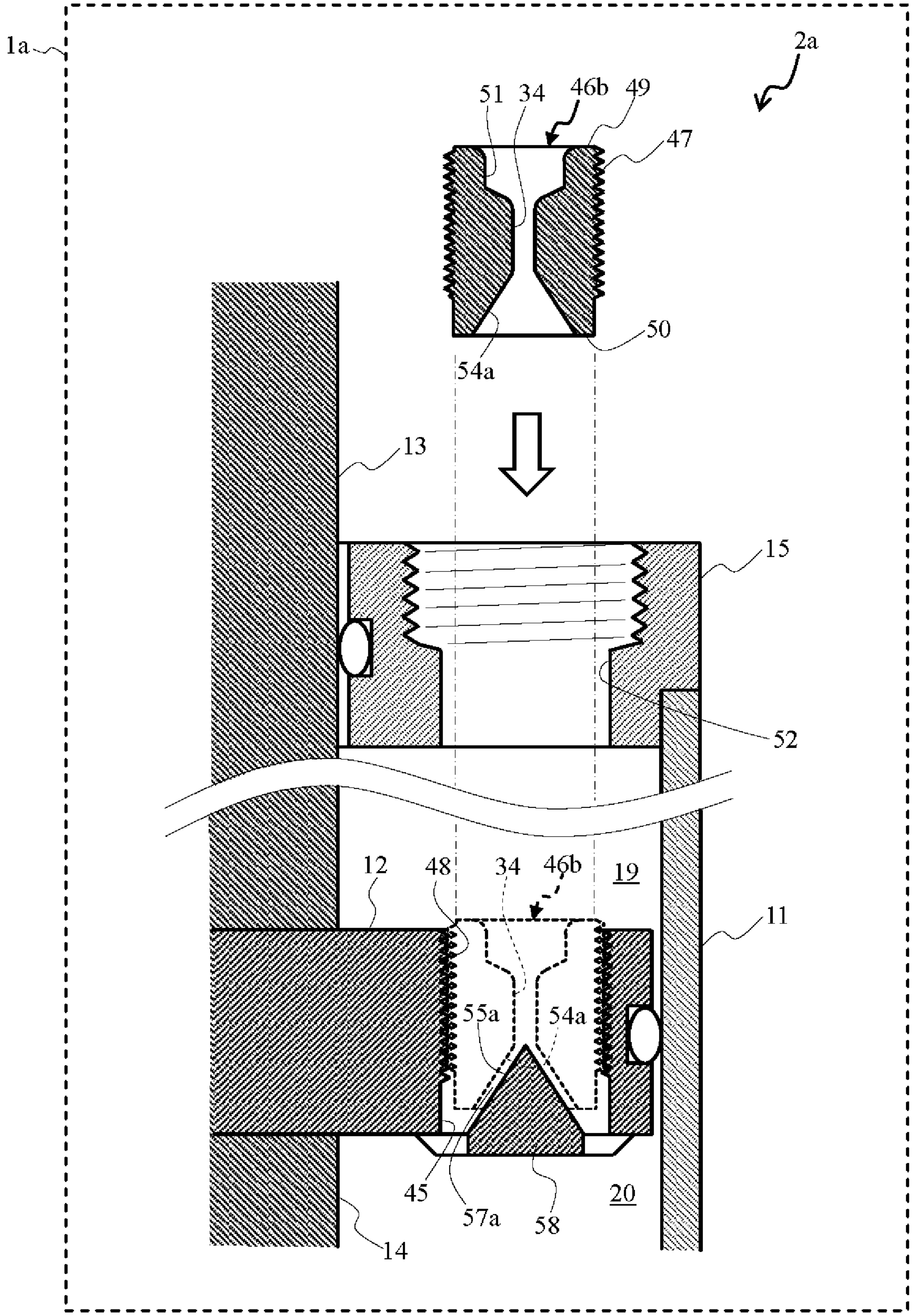
FIG. 14 is a cross-sectional view schematically illustrating a second modification of the present device.

Next, with reference to FIG. 14, a second modification of the piston-cylinder mechanism 2*a* in FIGS. 10 and 11 is described. FIG. 14 basically illustrates the relevant parts of the piston-cylinder mechanism 2*a* before the plug is fitted, while illustrating the plug having already been fitted by dotted lines. A plug 46*b* in the present modification is different from the plug 46 in that the second end face 50 of the plug 46 described above has a conical face 54*a* that is recessed into a conical shape or a truncated conical shape coaxial with the axis. A conical structure 58 that forms an opposed conical face 55*a*, opposed to the conical face 54*a* when the plug 46*b* is screw-fitted into the through hole 45, is supported by the piston 12 in such a manner as to prevent the conical structure 58 from closing the through hole 45 on the side of the plug 46*b* near the second fluid chamber 20. The orifice flow passage 34 is formed on the axis of the plug 46*b* in order to evenly supply fluid to a gap 57*a* formed between the conical face 54*a* and the opposed conical face 55*a*. The gap 57*a* connected to the orifice flow passage 34 forms a portion of the orifice flow passage 34.

The minute flow quantities $q_1$ and $q_2$ of fluid flows between the first fluid chamber 19 and the second fluid chamber 20 through the orifice flow passage 34 in the plug 46*b* including the gap 57*a*. The spacing of the gap 57*a* varies according to the screwing amount of the male thread 47 of the plug 46*b* relative to the female thread 48 on the through hole 45. With this configuration, the orifice flow passage 34 has a variable throttle valve that serves as a throttle unit and that uses the spacing of the gap 57*a* as a throttle opening of the flow passage. Therefore, the plug 46*b* enables the velocity of the movable cylinder 11 to be reduced by a desired reduction amount by adjusting the screwing amount described above. This can eliminate the necessity for replacement of the plug. Since the orifice flow passage 34 is provided with the variable throttle valve obtained by using the gap 57*a*, the orifice flow passage 34 from which an orifice is omitted may simply serve as a short-circuit flow passage connecting (short-circuiting) the first fluid chamber 19 and the second fluid chamber 20 so as to communicate with each other.

Figure 15:
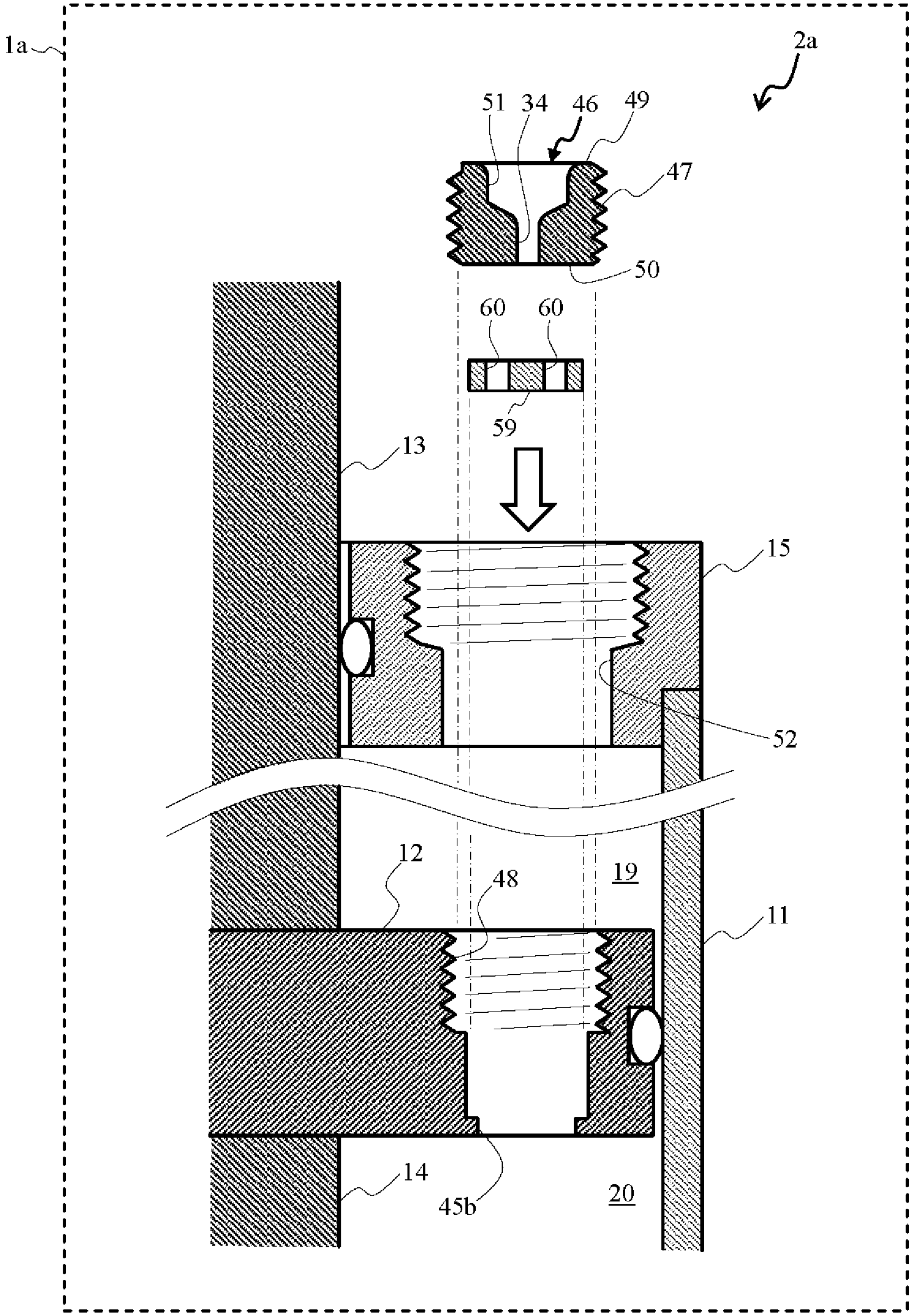
FIG. 15 is a cross-sectional view schematically illustrating a third modification of the present device.
Figure 16:
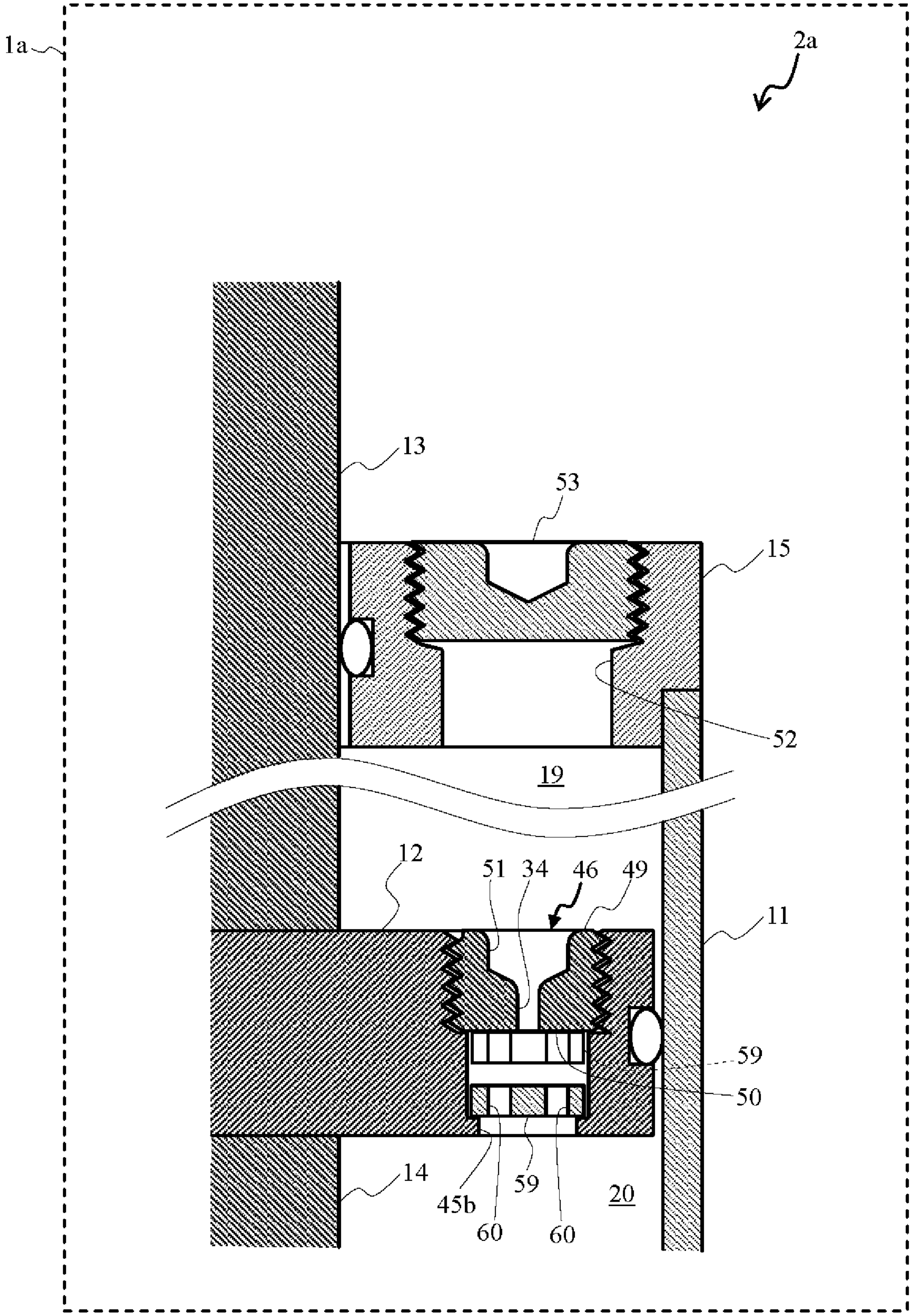
FIG. 16 is a cross-sectional view illustrating a plug-fitted state in the third modification.

Next, with reference to FIGS. 15 and 16, a third modification of the piston-cylinder mechanism 2*a* in FIGS. 10 and 11 is described. FIG. 15 illustrates the relevant parts of the piston-cylinder mechanism 2*a* before the plug is fitted. FIG. 16 illustrates the relevant parts of the piston-cylinder mechanism 2*a* in a plug-fitted state. In the present modification, the piston-cylinder mechanism 2*a* includes a valve body 59 near the side of the plug 46 facing the second fluid chamber 20 when the plug 46 is fitted into a through hole 45*b*. The valve body 59 has a function of allowing fluid to flow from the first fluid chamber 19 into the second fluid chamber 20 through the orifice flow passage 34, and blocking the fluid from flowing from the second fluid chamber 20 into the first fluid chamber 19 through the orifice flow passage 34.

In contrast to this, the through hole 45*b* is different from the through hole 45 in that the plug 46 is configured to be able to be screwed in from the first fluid chamber 19 only halfway through the through hole 45*b* toward the second fluid chamber 20. In a portion of the through hole 45*b* closer to the second fluid chamber 20 than the second end face 50 of the plug 46 screw-fitted into the through hole 45*b*, the valve body 59 is held in such a manner as to be movable in parallel to the penetration direction of the through hole 45*b*. The valve body 59 includes one or a plurality of fluid passage holes 60 through which fluid having flowed out of the orifice flow passage 34 in the plug 46 screw-fitted into the through hole 45*b* passes to the second fluid chamber 20. The valve body 59 is formed so as to close an opening of the orifice flow passage 34 that is open toward the second end face 50, or close an intermediate flow passage (not illustrated) connected to this opening, when the valve body 59 moves in a direction toward the plug 46 screw-fitted into the through hole 45*b* (see the valve body 59 shown by broken lines in FIG. 16). That is, the fluid passage holes 60 are formed in such a manner that the fluid passage holes 60 do not overlap the opening of the orifice flow passage 34 that is open toward the second end face 50, or overlap the above intermediate flow passage (not illustrated) in the penetration direction of the through hole 45*b*.

When the internal pressures $P_{A1}$ and $P_{A2}$ in the first fluid chamber 19 become higher than the internal pressures $P_{B1}$ and $P_{B2}$ in the second fluid chamber 20, the valve body 59 moves in a direction away from the plug 46. With this movement, the fluid in the first fluid chamber 19 passes through the orifice flow passage 34 and the fluid passage holes 60, and then flows to the second fluid chamber 20. In contrast, when the internal pressures $P_{B1}$ and $P_{B2}$ in the second fluid chamber 20 become higher than the internal pressures $P_{A1}$ and $P_{A2}$ in the first fluid chamber 19, the valve body 59 moves in a direction toward the plug 46. Since the valve body 59 closes the opening of the orifice flow passage 34 that is open toward the second end face 50, or closes the above intermediate flow passage (not illustrated), the fluid is blocked from flowing out from the second fluid chamber 20 to the first fluid chamber 19. In the manner as described above, the valve body 59 enables only the movement velocity of the movable cylinder 11 in the direction D1 to be selectively reduced in both the injection mode and the suction mode.

Figure 17:
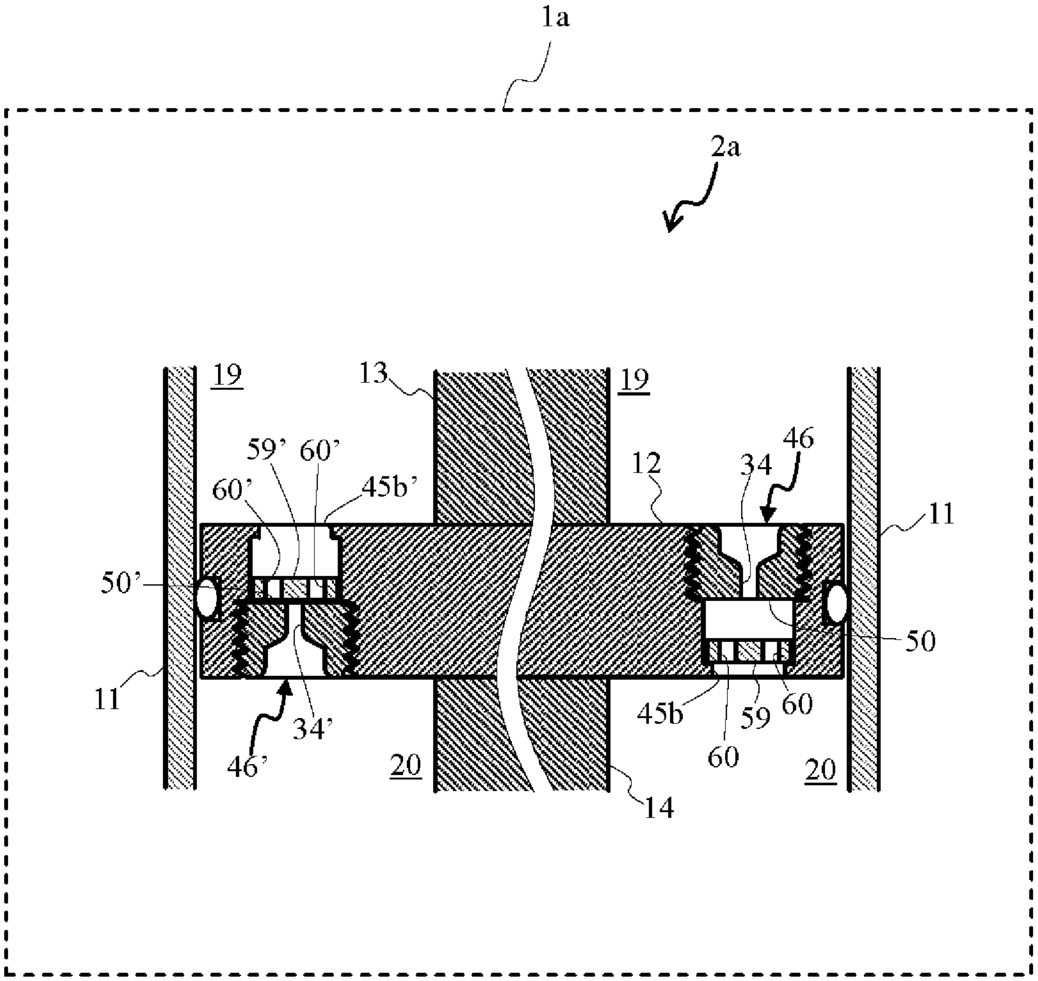
FIG. 17 is a cross-sectional view illustrating a fitted state of a plurality of plugs in the third modification.

In a case where the amount of reduction in the movement velocity of the movable cylinder 11 is set individually for the direction D1 and the direction D2 in both the injection mode and the suction mode, the configuration as illustrated in FIG. 17 may be employed. That is, a through hole **45*b*' is drilled in the piston 12 at a position separate from the through hole 45*b*. The through hole 45*b*' is formed such that a plug 46' similar to the plug 46 can be screwed in from the second fluid chamber 20 only halfway through the through hole 45*b*' toward the first fluid chamber 19. Then, a valve body 59' similar to the valve body 59 may be provided on the side of the plug 46' near the first fluid chamber 19 when the plug 46' is fitted into the through hole 45*b*'**.

When the internal pressures $P_{A1}$ and $P_{A2}$ in the first fluid chamber 19 become higher than the internal pressures $P_{B1}$ and $P_{B2}$ in the second fluid chamber 20, the valve body 59' moves in a direction toward the plug 46'. As illustrated in FIG. 17, since the valve body 59' closes the opening of the orifice flow passage 34' that is open toward a second end face 50', or closes an intermediate flow passage (not illustrated) connected to the opening, the fluid is blocked from flowing out from the first fluid chamber 19 to the second fluid chamber 20. In contrast, when the internal pressures $P_{B1}$ and $P_{B2}$ in the second fluid chamber 20 become higher than the internal pressures $P_{A1}$ and $P_{A2}$ in the first fluid chamber 19, the valve body 59' moves in a direction away from the plug 46'. With this movement, the fluid in the second fluid chamber 20 passes through the orifice flow passage 34' and fluid passage holes 60', and then flows to the first fluid chamber 19. Therefore, provided that the flow-passage cross-sectional areas of two orifices of the orifice flow passage 34 and the orifice flow passage 34' differ from each other, then the amount of reduction in the movement velocity of the movable cylinder 11 can be set individually for the direction D1 and for the direction D2.

The valve bodies 59 and 59' in the present modification are also applicable to the first modification in which the plug **46*a* is fitted into the through hole 45*a*, and the second modification in which the plug 46*b* is fitted into the through hole 45. That is, the inner circumferential surface of the through hole 45*b* may be deformed to provide an intermediate flow passage communicating with the gaps 57 and 57*a*, and the valve bodies 59 and 59'** may be disposed so as to close this intermediate flow passage.

The valve bodies 59 and 59' are not limited to having the configuration illustrated in FIGS. 15 to 17. The valve bodies 59 and 59' may be made of a flexible material that closes the openings of the orifice flow passages 34 and 34' that are open toward the second end faces 50 and 50', respectively. For example, when the internal pressures $P_{A1}$ and $P_{A2}$ in the first fluid chamber 19 become higher than the internal pressures $P_{B1}$ and $P_{B2}$ in the second fluid chamber 20, the valve body 59 elastically deforms to unblock the opening of the orifice flow passage 34 that is open toward the second end face 50, so that the fluid in the first fluid chamber 19 flows to the second fluid chamber 20 through the orifice flow passage 34. In contrast, when the internal pressures $P_{B1}$ and $P_{B2}$ in the second fluid chamber 20 become higher than the internal pressures $P_{A1}$ and $P_{A2}$ in the first fluid chamber 19, the valve body 59 closes the opening of the orifice flow passage 34 that is open toward the second end face 50 to thereby block the fluid from flowing from the second fluid chamber 20 to the first fluid chamber 19 through the orifice flow passage 34.

Third Embodiment

Figure 18:
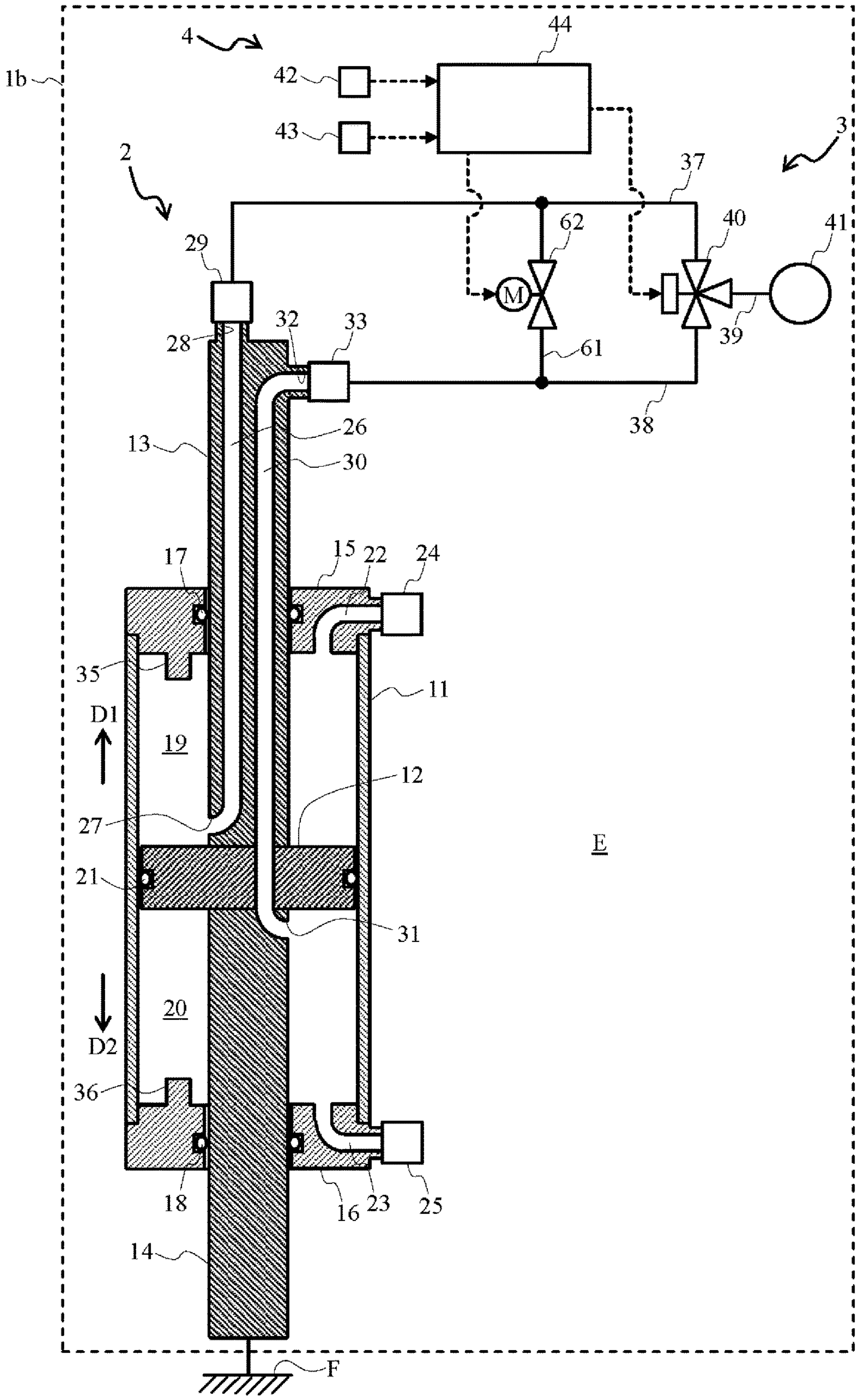
FIG. 18 is a schematic configuration diagram schematically illustrating one mode of a fluid injection or suction device according to a third embodiment.
Figure 19:
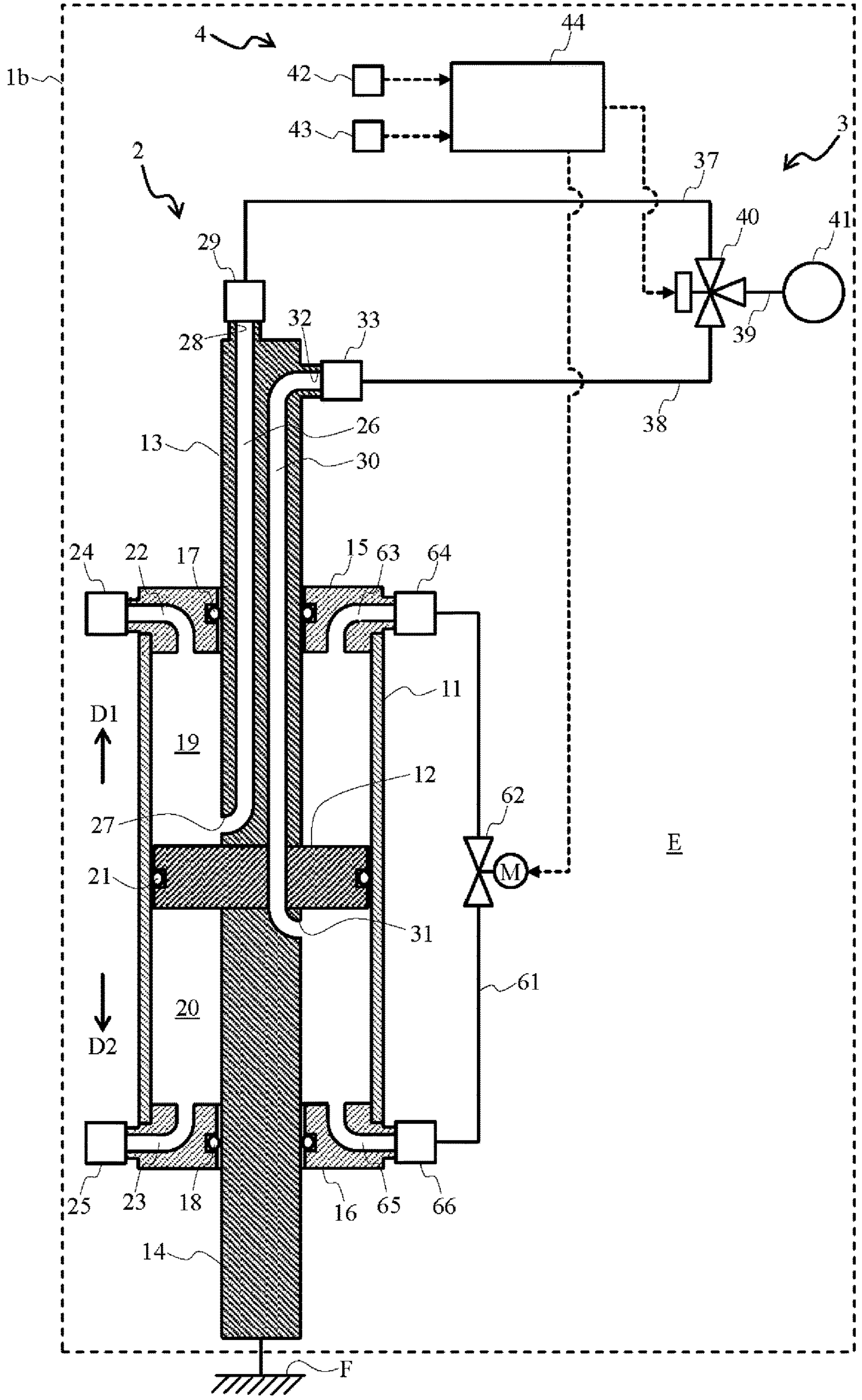
FIG. 19 is a schematic configuration diagram schematically illustrating another mode of the present device.

With reference to FIGS. 18 and 19, a fluid device according to a third embodiment is described. A fluid device **1*b* according to the present embodiment is different from the first embodiment in that a short-circuit flow passage that short-circuits the first flow-passage system and the second flow-passage system is formed via a short-circuit pipe 61 that is present externally to the movable cylinder 11, instead of the orifice flow passage 34, and the short-circuit pipe 61 is provided with a flow-rate adjustment valve 62. The flow-rate adjustment valve 62 is a throttle valve that can steplessly adjust the passage flow rate by changing its throttle opening. Also, the flow-rate adjustment valve 62 is an electric-operated valve with a controllable throttle opening to be controlled by the controller 44. In FIG. 19, illustrations of the protruding portions 35 and 36** are omitted for convenience sake.

For example, as illustrated in FIG. 18, the short-circuit pipe 61 connects the first external pipe 37 and the second external pipe 38 so as to communicate with each other, and the flow-rate adjustment valve 62 is disposed in the short-circuit pipe 61. As another example, as illustrated in FIG. 19, the short-circuit pipe 61 connects a connector 64 communicating with the first fluid chamber 19 through a communication passage 63 and a connector 66 communicating with the second fluid chamber 20 through a communication passage 65 such that the connectors 64 and 66 communicate with each other. The flow-rate adjustment valve 62 is disposed in the short-circuit pipe 61. In short, it suffices in the fluid device 1 that the short-circuit pipe 61 can short-circuit the first flow-passage system and the second flow-passage system by means of either connecting the mobile elements such as the movable cylinder 11 to each other so as to communicate with each other, or connecting the stationary elements that are stationary relative to the mobile elements to each other so as to communicate with each other.

The flow-rate adjustment valve 62 disposed in the short-circuit pipe 61 is opened at a predetermined throttle opening, so that similarly to the orifice flow passage 34, the above minute flow quantities $q_1$ and $q_2$ of fluid flows between the first flow-passage system and the second flow-passage system. With this configuration, when the movable cylinder 11 moves in the injection mode, the velocity of the movable cylinder 11 can be reduced, while the injection flow rate of the first nozzle 24 and the injection flow rate of the second nozzle 25 are prevented from being decreased. In contrast, when the movable cylinder 11 moves in the suction mode, the velocity of the movable cylinder 11 can be reduced, while the suction flow rate of the first nozzle 24 and the suction flow rate of the second nozzle 25 are prevented from being decreased.

Based on Equations (12) and (25) described above, the velocity reduction amount of the movable cylinder 11 is set according to the values of minute flow quantities $q_1$ and $q_2$ of the orifice flow passage 34, while the values of minute flow quantities $q_1$ and $q_2$ vary according to the flow-passage cross-sectional area of the orifice flow passage 34. Therefore, the velocity of the movable cylinder 11 can be reduced by a desired reduction amount by appropriately adjusting the throttle opening of the flow-rate adjustment valve 62.

Fourth Embodiment

Figure 20:
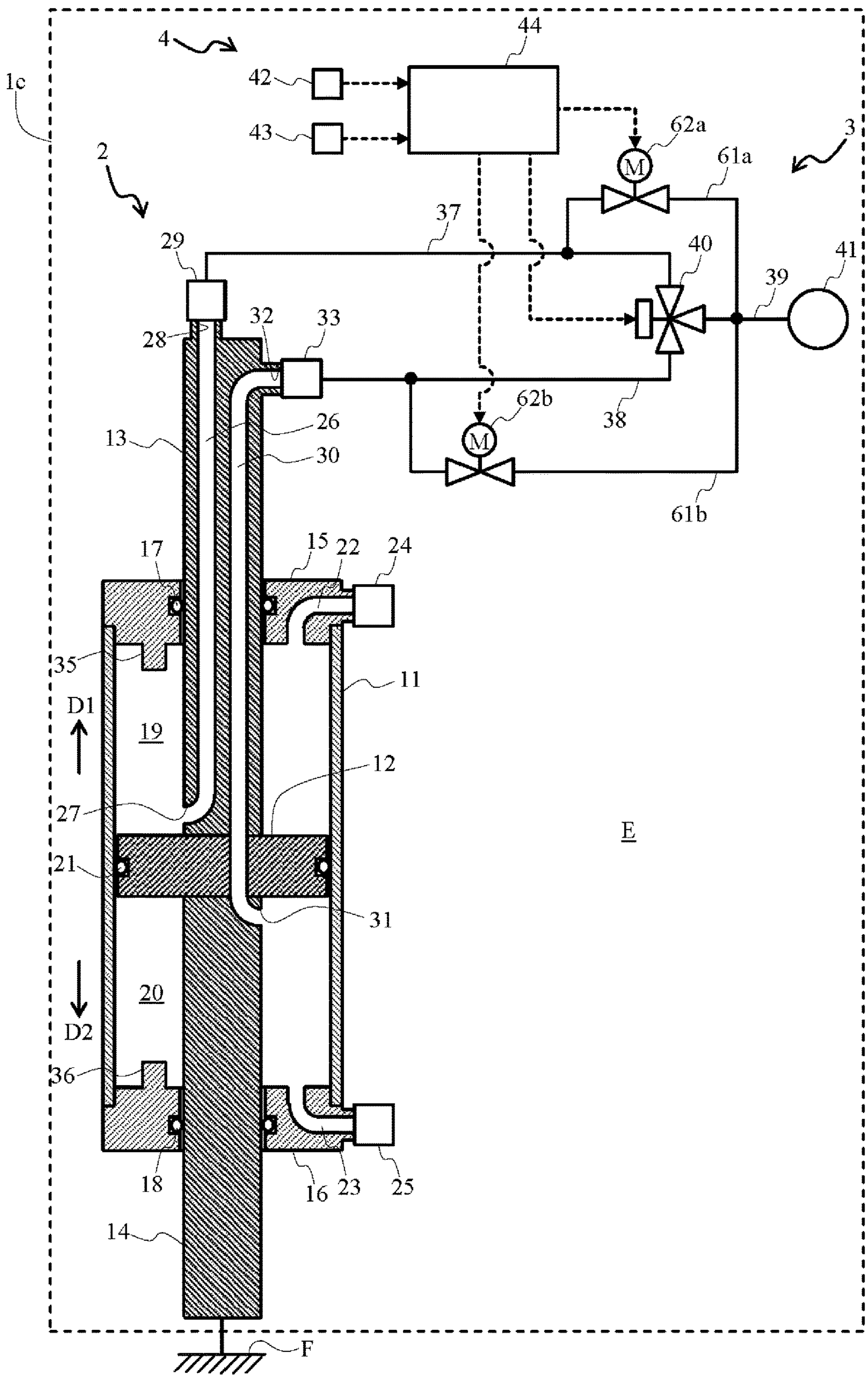
FIG. 20 is a schematic configuration diagram schematically illustrating one mode of a fluid injection or suction device according to a fourth embodiment.
Figure 21:
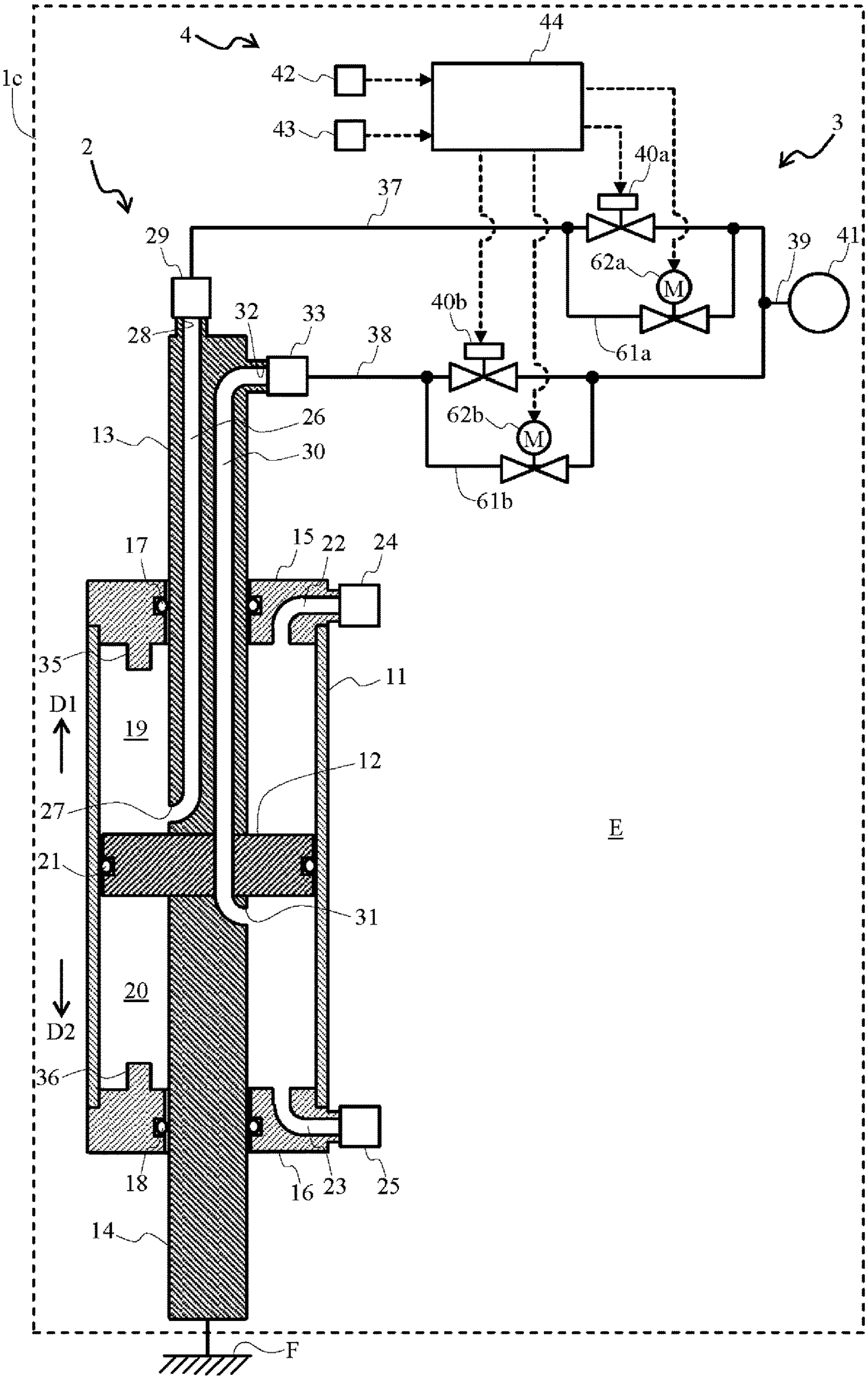
FIG. 21 is a schematic configuration diagram schematically illustrating another mode of the present device.

With reference to FIGS. 20 and 21, a fluid device according to a fourth embodiment is described. A fluid device 1*c* according to the present embodiment is different from the first embodiment in the following points. That is, the fluid device 1*c* is different from the first embodiment in that a short-circuit flow passage that short-circuits the first flow-passage system and the second flow-passage system is formed via two short-circuit pipes 61*a* and 61*b* that are present externally to the movable cylinder 11, instead of the orifice flow passage 34, and a first flow-rate adjustment valve 62*a* is disposed in the first short-circuit pipe 61*a*, while a second flow-rate adjustment valve 62*b* is disposed in the second short-circuit pipe 61*b*. The flow-rate adjustment valves 62*a* and 62*b* are electric-operated valves similar to the flow-rate adjustment valve 62.

For example, as illustrated in FIG. 20, the first flow-rate adjustment valve 62*a* is disposed in the first short-circuit pipe 61*a* connecting the pressure connection pipe 39 and the first external pipe 37 so as to communicate with each other. Also, the second flow-rate adjustment valve 62*b* is disposed in the second short-circuit pipe 61*b* connecting the pressure connection pipe 39 and the second external pipe 38 so as to communicate with each other. As another example, in a case where two units of two-way solenoid valves 40*a* and 40*b* are used as the flow-passage switching valve 40 as described above, the first flow-rate adjustment valve 62*a* is disposed in the first short-circuit pipe 61*a* connecting one of two branch pipes of the pressure connection pipe 39 to the first external pipe 37 so as to communicate with each other, while bypassing the two-way solenoid valve 40*a*, as illustrated in FIG. 21. Similarly, the second flow-rate adjustment valve 62*b* is disposed in the second short-circuit pipe 61*b* connecting the other of the two branch pipes of the pressure connection pipe 39 to the second external pipe 38 so as to communicate with each other, while bypassing the two-way solenoid valve 40*b*.

In a case where fluid flows between the fluid pressure source 41 and the target space E through the first flow-passage system, the second flow-rate adjustment valve 62*b* is opened at a predetermined throttle opening, so that similarly to the orifice flow passage 34, the above minute flow quantities $q_1$ and $q_2$ of fluid flows between the first flow-passage system and the second flow-passage system. In contrast, in a case where fluid flows between the fluid pressure source 41 and the target space E through the second flow-passage system, the first flow-rate adjustment valve 62*a* is opened at a predetermined throttle opening, so that similarly to the orifice flow passage 34, the above minute flow quantities $q_1$ and $q_2$ of fluid flows between the first flow-passage system and the second flow-passage system. With this configuration, when the movable cylinder 11 moves in the injection mode, the velocity of the movable cylinder 11 can be reduced, while the injection flow rate of the first nozzle 24 and the injection flow rate of the second nozzle 25 are prevented from being decreased. In contrast, when the movable cylinder 11 moves in the suction mode, the velocity of the movable cylinder 11 can be reduced, while the suction flow rate of the first nozzle 24 and the suction flow rate of the second nozzle 25 are prevented from being decreased.

Based on Equations (12) and (25) described above, the velocity reduction amount of the movable cylinder 11 is set according to the values of minute flow quantities $q_1$ and $q_2$ of the orifice flow passage 34, while the values of minute flow quantities $q_1$ and $q_2$ vary according to the flow-passage cross-sectional area of the orifice flow passage 34. Therefore, by appropriately adjusting the throttle opening of the first flow-rate adjustment valve 62*a*, the velocity reduction amount for the movement of the movable cylinder 11 in the direction D2 in the injection mode, and for the movement of the movable cylinder 11 in the direction D1 in the suction mode can be set to a desired value. In contrast, by appropriately adjusting the throttle opening of the second flow-rate adjustment valve 62*b*, the velocity reduction amount for the movement of the movable cylinder 11 in the direction D1 in the injection mode, and for the movement of the movable cylinder 11 in the direction D2 in the suction mode can be set to a desired value. With this configuration, in both the injection mode and the suction mode, the velocity reduction amount of the movable cylinder 11 can be set to different values between when the movable cylinder 11 moves in the direction D1 and when the movable cylinder 11 moves in the direction D2.

While the contents of the present invention have been specifically explained with reference to the preferred embodiments thereof, it is obvious that those skilled in the art may employ variously modified modes as described below based on the basic technical spirit and teachings of the present invention.

In the first to fourth embodiments described above, instead of forming the movable cylinder 11 in a straight tubular shape and forming the guides 13 and 14 into a straight line shape, these elements may be formed in the manner as described below. That is, the movable cylinder 11 may be formed in a circular tubular shape, and the guides 13 and 14 may extend outward from the piston 12 inserted in the movable cylinder 11 along the shape of the movable cylinder 11 through opposite opening end portions of the movable cylinder 11 and then extend in an arc-like curved shape. With this configuration, even when an injection or suction target is curved into an arc-like shape, it is still possible to inject or suction the fluid to the target.

In the movable cylinder 11, a single nozzle is provided for each of the fluid chambers 19 and 20 such that the nozzle communicates with each of the fluid chambers 19 and 20. However, a plurality of nozzles may be provided for each individual fluid chamber such that the nozzles communicate with each individual fluid chamber. Further, the nozzles 24 and 25 may be provided directly on the movable cylinder 11 not through the closing members 15 and 16 (not through the communication passages 22 and 23) such that the nozzles 24 and 25 communicate with the fluid chambers 19 and 20, respectively.

Instead of determining whether the movable cylinder 11 has reached the D1 regulated position or the D2 regulated position based on output signals from the first proximity detector 42 and the second proximity detector 43, the controller 44 may estimate the D1 regulated position and the D2 regulated position based on a count output of a timer.

The flow-passage switching valve 40 and the flow-rate adjustment valves 62, 62*a*, and 62*b* may be manually-operated valves that are manually operated by an operator, instead of being externally-controllable solenoid valves or electric-operated valves. In this case, the operator can visually confirm that the movable cylinder 11 has stopped at the D1 regulated position or the D2 regulated position, and can then operate the flow-passage switching valve 40. This makes it possible to omit the controller 44.

Instead of the outer openings 28 and 32 in the first guide 13, the outer openings 28 and 30 may be provided in the second guide 14, and accordingly the internal flow passages 26 and 30 may be formed to extend from these openings to the inner openings 27 and 31, respectively. In order to reduce the cross-sectional outer shape of the guides 13 and 14, either the outer opening 28 or the outer opening 32 may be provided in the second guide 14, and accordingly the internal flow passages 26 and 30 may be formed to extend from these openings to the inner openings 27 and 31, respectively.

In a case where the piston-cylinder mechanism 2 is located in, for example, a cylindrical filter to inject fluid to the inner circumferential surface of the filter or suction fluid from the inner circumferential surface of the filter through the nozzles 24 and 25, the piston-cylinder mechanism 2 is configured in the manner as described below. That is, in order that the movable cylinder 11 performs rotational motion along the outer circumferential surfaces of the piston 12 and the guides 13 and 14 in addition to the reciprocating motion described above, the piston 12 and the guides 13 and 14, and the through holes in the closing members 15 and 16 and the cylinder 11 are formed in a circular cross-sectional shape relative to each other.

The technical spirit explained in the first to fourth embodiments described above can be appropriately used in combination without causing any contradictions from the viewpoint of reducing the movement velocity of the movable cylinder 11 to a desired value. For example, it is assumed that there are circumstances where although the orifice flow passage 34 is drilled in the piston 12, the movement velocity of the movable cylinder 11 cannot be reduced to a desired value. For this assumption, an insufficient amount of reduction in the movement velocity can be compensated for by providing the flow-rate adjustment valve 62 in the short-circuit pipe 61 that short-circuits the first flow-passage system and the second flow-passage system, or by providing the flow-rate adjustment valves 62*a* and 62*b* respectively in the short-circuit pipes 61*a* and 61*b* connecting the pressure connection pipe 39 to the first external pipe 37 and to the second external pipe 38 so as to communicate with each other.

REFERENCE SIGNS LIST

1, 1*a*, 1*b*, 1*c* fluid device, 11 movable cylinder, 12 piston, 13 first guide, 14 second guide, 15 first closing member, 16 second closing member, 19 first fluid chamber, 20 second fluid chamber, 24 first nozzle, 25 second nozzle, 26 first internal flow passage, 30 second internal flow passage, 34, 34' orifice flow passage, 37 first external pipe, 38 second external pipe, 39 pressure connection pipe, 40 flow-passage switching valve, 41 fluid pressure source, 45, 45*a*, 45*b*, 45*b*' through hole, 46, 46*a*, 46*b*, 46' plug, 47 male thread, 48 female thread, 54, 54*a* conical face, 55, 55*a* opposed conical face, 57, 57*a* gap, 59, 59' valve body, 61, 61*a*, 61*b* short-circuit pipe, 62, 62*a*, 62*b* flow-rate adjustment valve, E target space

The invention claimed is:

1. A fluid injection or suction device that injects fluid to a target space or suctions fluid from the target space through nozzles, the device comprising:

a cylinder formed in a hollow tubular shape and closed at opposite opening end portions by closing members;

a piston that is inserted in the cylinder in a relatively movable manner between the opposite opening end portions, and that partitions an interior of the cylinder into a first fluid chamber and a second fluid chamber;

a guide extending from the piston inserted in the cylinder, penetrating the closing members to an exterior of the cylinder, and fixed to support the piston and guide movement of the cylinder in sliding contact with through holes in the closing members, the guide including a first internal flow passage that connects the first fluid chamber externally to a first external pipe so as to communicate with each other, and a second internal flow passage that connects the second fluid chamber externally to a second external pipe so as to communicate with each other, the guide having an area of a circumferential outer shape smaller than that of the piston;

a first nozzle of the nozzles, through which the first fluid chamber and the target space communicate with each other; and a second nozzle of the nozzles, through which the second fluid chamber and the target space communicate with each other, wherein a pipe to communicate with a fluid pressure source that generates fluid at a predetermined pressure is configured to switch between the first external pipe and the second external pipe, a flow passage from the fluid pressure source to the first nozzle and the second nozzle includes a short-circuit flow passage that short-circuits the first fluid chamber and the second fluid chamber, and that enables fluid to flow bidirectionally, and the short-circuit flow passage is provided with a throttle unit that throttles a flow passage, and the throttle unit is configured to cause the fluid to flow from a high-pressure-side fluid chamber toward a low-pressure-side fluid chamber according to an internal pressure difference generated between a fluid chamber that is one of the first fluid chamber and the second fluid chamber and that communicates with the fluid pressure source, and a fluid chamber that is the other of the first fluid chamber and the second fluid chamber and that does not communicate with the fluid pressure source, so as to cause the piston to relatively move, while reducing a volume decrease rate of the low-pressure-side fluid chamber wherein the short-circuit flow passage is formed in the piston, a through hole is drilled, penetrating the piston from a side facing the first fluid chamber to a side facing the second fluid chamber, and a plug is removably fitted into the through hole, and the short-circuit flow passage is formed in the plug, through which the first fluid chamber and the second fluid chamber communicate with each other.

2. The fluid injection or suction device according to claim 1, wherein the plug is screwed and fitted into the through hole, the plug includes a conical face coaxial with a rotation axis of the plug, and the through hole includes an opposed conical face that is opposed to the conical face when the plug is fitted into the through hole, the short-circuit flow passage is formed including a gap formed between the conical face and the opposed conical face, and the short-circuit flow passage includes, as the throttle unit, a variable throttle valve with a variable spacing of the gap according to a screwing amount of the plug relative to the through hole.

3. The fluid injection or suction device according to claim 2, wherein a valve body is provided near a side of the plug facing the second fluid chamber to allow fluid to flow from the first fluid chamber into the second fluid chamber through the short-circuit flow passage, and to block fluid from flowing from the second fluid chamber into the first fluid chamber through the short-circuit flow passage.

4. The fluid injection or suction device according to claim 3, wherein a separate through hole is further drilled in the piston, through which the first fluid chamber and the second fluid chamber communicate with each other, and the plug is further removably fitted into the separate through hole as an additional plug, and a valve body is provided near a side of the additional plug facing the first fluid chamber to allow fluid to flow from the second fluid chamber into the first fluid chamber through the short-circuit flow passage, and to block fluid from flowing from the first fluid chamber into the second fluid chamber through the short-circuit flow passage.

5. The fluid injection or suction device according to claim 1, wherein a valve body is provided near a side of the plug facing the second fluid chamber to allow fluid to flow from the first fluid chamber into the second fluid chamber through the short-circuit flow passage, and to block fluid from flowing from the second fluid chamber into the first fluid chamber through the short-circuit flow passage.

6. The fluid injection or suction device according to claim 5, wherein a separate through hole is further drilled in the piston, through which the first fluid chamber and the second fluid chamber communicate with each other, and the plug is further removably fitted into the separate through hole as an additional plug, and a valve body is provided near a side of the additional plug facing the first fluid chamber to allow fluid to flow from the second fluid chamber into the first fluid chamber through the short-circuit flow passage, and to block fluid from flowing from the first fluid chamber into the second fluid chamber through the short-circuit flow passage.

7. The fluid injection or suction device according to claim 1, wherein a work through hole through which the plug is insertable and removable is drilled in a first closing member of the closing members, the first closing member closing one opening end portion of the cylinder, and the work through hole is closed by a normally-closed lid in an openable and closable manner.

8. The fluid injection or suction device according to claim 7, wherein the plug is screwed and fitted into the through hole, the plug includes a conical face coaxial with a rotation axis of the plug, and the through hole includes an opposed conical face that is opposed to the conical face when the plug is fitted into the through hole, the short-circuit flow passage is formed including a gap formed between the conical face and the opposed conical face, and the short-circuit flow passage includes, as the throttle unit, a variable throttle valve with a variable spacing of the gap according to a screwing amount of the plug relative to the through hole.

9. The fluid injection or suction device according to claim 8, wherein a valve body is provided near a side of the plug facing the second fluid chamber to allow fluid to flow from the first fluid chamber into the second fluid chamber through the short-circuit flow passage, and to block fluid from flowing from the second fluid chamber into the first fluid chamber through the short-circuit flow passage.

10. Fluid injection or suction device according to claim 9, wherein a separate through hole is further drilled in the piston, through which the first fluid chamber and the second fluid chamber communicate with each other, and the plug is further removably fitted into the separate through hole as an additional plug, and a valve body is provided near a side of the additional plug facing the first fluid chamber to allow fluid to flow from the second fluid chamber into the first fluid chamber through the short-circuit flow passage, and to block fluid from flowing from the first fluid chamber into the second fluid chamber through the short-circuit flow passage.

11. The fluid injection or suction device according to claim 7, wherein a valve body is provided near a side of the plug facing the second fluid chamber to allow fluid to flow from the first fluid chamber into the second fluid chamber through the short-circuit flow passage, and to block fluid from flowing from the second fluid chamber into the first fluid chamber through the short-circuit flow passage.

12. The fluid injection or suction device according to claim 11, wherein a separate through hole is further drilled in the piston, through which the first fluid chamber and the second fluid chamber communicate with each other, and the plug is further removably fitted into the separate through hole as an additional plug, and a valve body is provided near a side of the additional plug facing the first fluid chamber to allow fluid to flow from the second fluid chamber into the first fluid chamber through the short-circuit flow passage, and to block fluid from flowing from the first fluid chamber into the second fluid chamber through the short-circuit flow passage.

13. The fluid injection or suction device according to claim 1, wherein a through hole is drilled, penetrating the piston from a side facing the first fluid chamber to a side facing the second fluid chamber, and a plug is removably fitted into the through hole, and the short-circuit flow passage is formed in the plug, through which the first fluid chamber and the second fluid chamber communicate with each other.

14. The fluid injection or suction device according to claim 1, wherein an orifice is included as the throttle unit.

15. A fluid injection or suction device that injects fluid to a target space or suctions fluid from the target space through nozzles, the device comprising:

a cylinder formed in a hollow tubular shape and closed at opposite opening end portions by closing members;

a piston that is inserted in the cylinder in a relatively movable manner between the opposite opening end portions, and that partitions an interior of the cylinder into a first fluid chamber and a second fluid chamber;

a guide extending from the piston inserted in the cylinder, penetrating the closing members to an exterior of the cylinder, and fixed to support the piston and guide movement of the cylinder in sliding contact with through holes in the closing members, the guide including a first internal flow passage that connects the first fluid chamber externally to a first external pipe so as to communicate with each other, and a second internal flow passage that connects the second fluid chamber externally to a second external pipe so as to communicate with each other, the guide having an area of a circumferential outer shape smaller than that of the piston;

a first nozzle of the nozzles, through which the first fluid chamber and the target space communicate with each other; and a second nozzle of the nozzles, through which the second fluid chamber and the target space communicate with each other, wherein a pipe to communicate with a fluid pressure source that generates fluid at a predetermined pressure is configured to switch between the first external pipe and the second external pipe, and the fluid injection or suction device includes a short-circuit pipe that connects the first external pipe and the second external pipe so as to communicate with each other, and a flow-rate adjustment valve is disposed in the short-circuit pipe as a throttle unit that throttles a flow passage.

16. A fluid injection or suction device that injects fluid to a target space or suctions fluid from the target space through nozzles, the device comprising:

a cylinder formed in a hollow tubular shape and closed at opposite opening end portions by closing members;

a piston that is inserted in the cylinder in a relatively movable manner between the opposite opening end portions, and that partitions an interior of the cylinder into a first fluid chamber and a second fluid chamber;

a guide extending from the piston inserted in the cylinder, penetrating the closing members to an exterior of the cylinder, and fixed to support the piston and guide movement of the cylinder in sliding contact with through holes in the closing members, the guide including a first internal flow passage that connects the first fluid chamber externally to a first external pipe so as to communicate with each other, and a second internal flow passage that connects the second fluid chamber externally to a second external pipe so as to communicate with each other, the guide having an area of a circumferential outer shape smaller than that of the piston;

a first nozzle of the nozzles, through which the first fluid chamber and the target space communicate with each other; and a second nozzle of the nozzles, through which the second fluid chamber and the target space communicate with each other, wherein a pipe to communicate with a fluid pressure source that generates fluid at a predetermined pressure is configured to switch between the first external pipe and the second external pipe by a flow-passage switching valve connected to the fluid pressure source through a pressure connection pipe, a flow passage from the fluid pressure source to the first nozzle and the second nozzle includes a short-circuit flow passage that short-circuits a flow passage communicating with the fluid pressure source and a flow passage not communicating with the fluid pressure source, the short-circuit flow passage includes a first short-circuit pipe and a second short-circuit pipe, the first short-circuit pipe bypassing the flow-passage switching valve and connecting the pressure connection pipe and the first external pipe so as to communicate with each other, and the second short-circuit pipe bypassing the flow-passage switching valve and connecting the pressure connection pipe and the second external pipe so as to communicate with each other, and a flow-rate adjustment valve is disposed individually in the first short-circuit pipe and in the second short-circuit pipe as a throttle unit that throttles each flow passage.

* * * * *